United States Patent
Jensen et al.

(10) Patent No.: US 12,533,367 B2
(45) Date of Patent: Jan. 27, 2026

(54) SELF-EMULSIFYING SYSTEMS FOR CANNABINOIDS

(71) Applicant: Fertin Pharma A/S, Vejle (DK)

(72) Inventors: Sanne Skov Jensen, Fredericia (DK);
Gitte Nykjær Nikolajsen, Viby J (DK);
Simon Laursen, Aarhus N (DK);
Dorthe Schackinger Boesen, Vejle (DK)

(73) Assignee: Fertin Pharma A/S, Vejle (DK)

( * ) Notice: Subject to any disclaimer, the term of this patent is extended or adjusted under 35 U.S.C. 154(b) by 0 days.

(21) Appl. No.: 18/612,067

(22) Filed: Mar. 21, 2024

(65) Prior Publication Data

US 2024/0316077 A1    Sep. 26, 2024

(30) Foreign Application Priority Data

Mar. 21, 2023 (DK) .............................. PA202300252
Mar. 21, 2023 (DK) .............................. PA202300253

(51) Int. Cl.
| | | |
|---|---|---|
| *A61K 31/00* | (2006.01) | |
| *A61K 9/00* | (2006.01) | |
| *A61K 9/48* | (2006.01) | |
| *A61K 36/185* | (2006.01) | |
| *A61K 47/02* | (2006.01) | |
| *A61K 47/10* | (2017.01) | |
| *A61K 47/14* | (2017.01) | |
| *A61K 47/26* | (2006.01) | |
| *A61K 47/44* | (2017.01) | |

(52) U.S. Cl.
CPC .......... *A61K 31/658* (2023.05); *A61K 9/0056* (2013.01); *A61K 9/4808* (2013.01); *A61K 36/3482* (2024.05); *A61K 47/02* (2013.01); *A61K 47/10* (2013.01); *A61K 47/14* (2013.01); *A61K 47/26* (2013.01); *A61K 47/44* (2013.01)

(58) Field of Classification Search
CPC ............................ A61K 31/658; A61K 9/0056
See application file for complete search history.

(56) References Cited

U.S. PATENT DOCUMENTS

| 9,308,175 B2 * | 4/2016 | Pellikaan | ................ A61P 25/08 |
|---|---|---|---|
| 2019/0015346 A1 | 1/2019 | Diorio | |
| 2020/0330423 A1 | 10/2020 | Brunn | |
| 2020/0345684 A1 | 11/2020 | Malpando | |
| 2021/0196775 A1 | 7/2021 | Karolchyk | |
| 2021/0228534 A1 | 7/2021 | Friedman | |
| 2022/0257772 A1 | 8/2022 | Wilson et al. | |
| 2023/0255896 A1 | 8/2023 | Fuisz | |

FOREIGN PATENT DOCUMENTS

| WO | WO2018152334 A1 | 8/2018 | |
|---|---|---|---|
| WO | WO-2019135225 A1 * | 7/2019 | ............. A61K 31/05 |
| WO | WO2020024011 A1 | 2/2020 | |
| WO | WO2020211915 A1 | 10/2020 | |
| WO | WO2020222029 A1 | 11/2020 | |
| WO | WO2023100138 A1 | 6/2023 | |

OTHER PUBLICATIONS

Pharmacodynamic dose effects of oral cannabis ingestion in healthy adults who infrequently use cannabis Schlienz et al. Drug and Alcohol Dependence 211 (2020) 107 (Year: 2020).*
Pharmacodynamic dose effects of oral cannabis ingestion in healthy adults who infrequently use cannabis Schlienz et al. Drug and Alcohol Dependence 211 (2020) 107969 (Year: 2020).*
Polyols as filler-binders for disintegrating tablets prepared by direct compaction Bolhuis et al. Drug Development and Industrial Pharmacy, 2009; 35(6): 671-677 (Year: 2009).*
Handbook of Pharmaceutical Excipients Sixth Edition Rowe et al. 2009 (Year: 2009).*
Technical Data Sheet MIGLYOL® 812 N (Excipient) IOI Oleochemical 2017 (Year: 2017).*

* cited by examiner

*Primary Examiner* — Jeffrey S Lundgren
*Assistant Examiner* — Eric Tran
(74) *Attorney, Agent, or Firm* — Forge IP, PLLC

(57) ABSTRACT

An orally dissolvable or chewable tableted powder formulation is presented. The formulation includes one or more carrier systems including one or more liquid or solid self-emulsifying systems loaded with cannabinoids in an amount of at least 10% by weight of the tableted powder formulation. The one or more self-emulsifying systems includes: at least one or more surfactants, one or more lipids and one or more isolated or synthetic cannabinoids when self-emulsifying system is a liquid self-emulsifying system, and at least one or more surfactants, one or more waxes and one or more isolated or synthetic cannabinoids when self-emulsifying system is a solid self-emulsifying system. The formulation further includes one or more water-soluble agents in an amount of 20-80% by weight of the tableted powder formulation and one or more flavors. The one or more surfactants includes one or more surfactants having a chemical structure that includes a polyethylene glycol moiety.

22 Claims, No Drawings

SELF-EMULSIFYING SYSTEMS FOR CANNABINOIDS

FIELD OF THE INVENTION

The invention relates to the field of cannabinoids. In particular, the invention relates to self-emulsifying systems for cannabinoids, such as self-emulsifying systems including surfactants with a polyethylene glycol moiety.

BACKGROUND OF THE INVENTION

Cannabinoids are a group of chemicals found in *Cannabis sativa, Cannabis indica, Cannabis ruderalis*, Marijuana plant and related plant species. They are known to activate cannabinoid receptors (CB1 and CB2). These chemicals are also produced endogenously in humans and other animals. Cannabinoids are cyclic molecules exhibiting particular properties such as being lipophilic, have the ability to easily cross the blood-brain barrier, and having low toxicity.

*Cannabis sativa* contains more than 400 chemicals and approximately 120 cannabinoids, the active constituents of cannabis, including tetrahydrocannabinol (THC), cannabidiol (CBD), cannabinol (CBN), tetrahydrocannabivarin (THCV) and cannabigerol (CBG). Pharmacologically, the principal psychoactive constituent of cannabis is tetrahydrocannabinol (THC), which is used for treating a wide range of medical conditions, including glaucoma, AIDS wasting, neuropathic pain, treatment of spasticity associated with multiple sclerosis, fibromyalgia, and chemotherapy-induced nausea. THC is also effective in the treatment of allergies, inflammation, infection, depression, migraine, bipolar disorders, anxiety disorder, drug dependency and drug withdrawal syndromes.

Gastrointestinal delivery of cannabinoids may provide some advantages compared to oral mucosal uptake of cannabinoids, particularly in relation to uptake of cannabinoids in the small intestines or the colon of the gastrointestinal tract involving uptake on a short time scale, but also on a long time scale. However, certain challenges arise if the cannabinoids are to be delivered in the oral cavity as part of a powder formulation, such as a chewable tableted powder formulation, but are to be delivered to mucosal surfaces in the gastrointestinal tract in order to benefit from improved uptake. Considerations such as the capability to withstand a low pH in the stomach, or various chemical or physical challenges, may imply that powder formulations may be problematic to apply as a delivery platform for cannabinoids intended for gastrointestinal uptake. Additionally, it may be problematic to obtain a suitable uptake in the gastrointestinal tract in view of these circumstances.

Specifically, certain systems for gastrointestinal delivery of cannabinoids would be expected to be degraded to a high degree and therefore resulting in less uptake in the gastrointestinal tract, such as the colon. Other systems for gastrointestinal delivery of cannabinoids would be expected to result in less cell uptake due to steric hindrance and thereby less uptake in the gastrointestinal tract, such as the small intestines.

Although oral administration of cannabinoids is a common route of administration, less attention has been given in the prior art to carrier systems that may allow a high amount of cannabinoids to be administered to patients in need thereof. Particularly, less attention has been given to carrier systems for cannabinoids that allow a high load of cannabinoids and at the same time provides convenience during oral administration. Typically, carrier systems may be expected to provide an inconvenient mouthfeel in oral formulations that are to be dissolved or disintegrated in the oral cavity.

A special challenge applies in case the carrier systems are to be released in the oral cavity, such as when the oral application form is partly dissolved or partly disintegrated in the oral cavity, but the carrier systems containing the cannabinoids are to be delivered in the gastrointestinal tract for absorption of the cannabinoids. Under these circumstances, it may be critical to provide a special carrier system which may allow the cannabinoids to be contained in the carrier for a relatively long time in order for the carrier system to be delivered in the gastrointestinal tract with a high load of cannabinoids.

Additionally, less attention has been given to administration of high doses of cannabinoids and the associated mouthfeel during or after partly dissolution or partly disintegration in the oral cavity of the application form. Typically, when carrier systems are present it may be expected that the carrier systems as such will accommodate an unsuitable mouthfeel, such as a sandy feeling or even a creaking sound upon mastication of the application form with a content of the carrier system.

The challenges of carrier systems may particularly be the case if a high load of cannabinoids are to be present and accordingly a high load of the carrier system is present in the formulation. At the same time, homogeneity and/or release of the cannabinoid in the application form is of importance which in some cases may be a challenge if the cannabinoids are applied in a carrier system.

Furthermore, it is preferable that a formulation is provided that may also help in obtaining improved sensorics properties of oral cannabinoid delivery. Here, important sensorics properties include texture, flavor perception, sweetness perception and off-notes associated with cannabinoids. These properties are both relevant from a convenience perspective in solid dosage forms, but certainly also in order to support an appropriate delivery of cannabinoids from the tablets and avoid adverse side effects of cannabinoids.

Hence, there is a need in the prior art for powders and formulations that solve the above-referenced challenges and problems of the prior art. In particular, there is a need in the prior art for powders to be applied in various administration form, such as tablets, pouches, chewing gums and lozenges, that are both associated with a suitable uniformity of content of the cannabinoids and offer suitable sensorial properties.

More particularly, it is a desire that these formulations are also acceptable or improved with respect to taste masking and give a desired release of the carrier systems in the oral cavity and a desired release of cannabinoids for gastrointestinal absorption.

Finally, there is a need in the prior art for systems that may accommodate increased uptake of cannabinoids in the gastrointestinal tract, such as the small intestines or the colon. At the same time, there is a need for systems that provide suitable stability of cannabinoids, when for instance uptake of cannabinoids is to occur in the small intestines or colon.

SUMMARY OF THE INVENTION

Accordingly, there is provided an orally dissolvable or chewable tableted powder formulation, comprising one or more carrier systems comprising one or more liquid or solid self-emulsifying systems loaded with cannabinoids in an amount of at least 10% by weight of the tableted powder formulation, where the one or more self-emulsifying systems includes i) at least one or more surfactants, one or more lipids and one or more isolated or synthetic cannabinoids when the self-emulsifying system is a liquid self-emulsifying system, and ii) at least one or more surfactants, one or more waxes and one or more isolated or synthetic cannabinoids when the self-emulsifying system is a solid self-emulsifying system, and where the powder formulation further comprises one or more water-soluble agents in an amount of 20-80% by weight of the tableted powder formulation; and one or more flavors.

Furthermore, there is provided an orally dissolvable or chewable tableted powder formulation, comprising one or more carrier systems comprising one or more liquid or solid self-emulsifying systems loaded with cannabinoids in an amount of at least 10% by weight of the tableted powder formulation, where the one or more self-emulsifying systems includes i) at least one or more surfactants, one or more lipids and one or more isolated or synthetic cannabinoids when the self-emulsifying system is a liquid self-emulsifying system, and ii) at least one or more surfactants, one or more waxes and one or more isolated or synthetic cannabinoids when the self-emulsifying system is a solid self-emulsifying system, and where the powder formulation further comprises one or more water-soluble agents in an amount of 20-80% by weight of the tableted powder formulation; and one or more flavors, wherein said one or more self-emulsifying systems is stable at a pH of about 1-4 and being operable to gastrointestinal tract delivery of the one or more cannabinoids upon release of the one or more carrier systems in the oral cavity.

In some embodiments of the invention, the one or more self-emulsifying systems is stable at a pH of about 1-4.

In some embodiments of the invention, the one or more self-emulsifying systems is operable to gastrointestinal tract delivery of the one or more cannabinoids upon release of the one or more carrier systems in the oral cavity.

In some embodiments of the invention, the one or more self-emulsifying systems is stable at a pH of about 1-4 and being operable to gastrointestinal tract delivery of the one or more cannabinoids upon release of the one or more carrier systems in the oral cavity.

One of the advantages according to the invention is that a carrier system is provided that may allow the cannabinoids to be contained in the carrier for a relatively long time in order for the carrier system to be delivered in the gastrointestinal tract in a relatively high load.

Additionally, it was seen that the carrier system may withstand the conditions in the stomach, such as a low pH value, without being critically effected by such conditions and allowing effective delivery of the cannabinoids in the gastrointestinal tract, such as in the intestines.

In accordance with the invention, it was not expected that a high load of cannabinoids could be obtained and at the same time that the tableted powder formulation could serve to deliver the cannabinoids to the gastrointestinal target without the challenges disclosed in the prior art. The challenges of carrier systems is particularly the case if a high load of cannabinoids are to be present and accordingly a high load of the carrier system is present in the formulation.

A special advantage of the present invention is that the system is especially suitable for release of the carrier system in the oral cavity, such as when the oral application form is partly dissolved or partly disintegrated in the oral cavity, and subsequent delivery of the carrier system in the gastrointestinal tract for absorption of the cannabinoids. Under these circumstances, it was seen that the carrier system may allow the cannabinoids to be contained in the carrier for a relatively long time in order for the carrier system to be delivered in the gastrointestinal tract with a high load of cannabinoids.

At the same time, homogeneity of the cannabinoid in the application form is of importance which in some cases may be a challenge if the cannabinoids are applied in a carrier system. These challenges may also be overcome by the present invention. Accordingly, variations may be avoided and a safe and convenient delivery may be obtained.

Furthermore, a formulation is provided that may also help in obtaining improved sensorics properties of oral cannabinoid delivery. Here, important sensorics properties include texture, flavor perception, sweetness perception and off-notes associated with cannabinoids. These properties are both relevant from a convenience perspective in solid dosage forms, but certainly also in order to support an appropriate delivery of cannabinoids from the tablets and avoid adverse side effects of cannabinoids.

Another challenge is that cannabinoids tend to be associated with off-notes if delivered in the oral cavity due to the specific physiochemical properties of the compounds. Since the cannabinoids may be contained in carriers according to the invention, this challenge off-notes are less predominant during administration according to the invention.

In some embodiments of the invention, the one or more surfactants comprises one or more surfactants having a chemical structure that includes a polyethylene glycol (PEG) moiety. In the present context "moiety" is given the common understanding within organic chemistry, i.e., the polyethylene glycol moiety is part of a molecule and can be identified as such within the molecule. This may be as a tail of the surfactant, being a side group of the surfactant, being part of a chain within the surfactant, etc. In the present context, a "polyethylene glycol moiety" is specifically not free polyethylene glycol.

One of the advantages of including one or more surfactants having a chemical structure that includes a polyethylene glycol (PEG) moiety as part of self-emulsifying systems according to the invention is that in vivo uptake of cannabinoids was seen to be surprisingly increased. This was highly unexpected since a high content of PEG in the surfactant was theoretically expected to result in less cell uptake due to expected high steric hindrance of a surfactant with a PEG moiety for cell uptake. However, the exact opposite was seen, which was a great surprise to the inventors.

Specifically, it was seen that the in vivo uptake of cannabinoids in rats by including a surfactant with polyethylene glycol (PEG) moiety as part of self-emulsifying systems according to the invention was especially pronounced on a short time scale as cannabinoid plasma concentration was initially very high as function of time compared to self-emulsifying systems containing other surfactants, such as surfactants without the PEG moiety, when applied in an in vivo test set-up with rats. Also, the plasma concentration was initially very high compared to the reference, Epidiolex®, which system contains a high content of sesame oil, which by the way is problematic due to adverse laxative properties.

As using herein, the term "long time scales" denotes more than 240 minutes after administration of cannabinoids in vivo in rats and "short time scales" denote less than 240 minutes after administration of cannabinoids in vivo in rats. Without being bound by theory, it is believed that "short time scales" may indicate uptake in the small intestine of the rats, whereas "long time scales" may indicate uptake in the colon of rats.

However, not only was a surprisingly initial uptake seen by including one or more surfactants having a chemical structure that include a polyethylene glycol (PEG) moiety as part of self-emulsifying systems according to the invention. Also, an overall uptake of cannabinoids was seen to be high as a function of time, including a relative high uptake on a long time scale as indicated by an elevated plasma concentration of cannabinoids as function of time. Compared to the reference, Epidiolex®, the overall uptake of cannabinoids, including uptake on both short and long time scales, was on average at the same level and even higher.

Furthermore, the stability of self-emulsifying systems with surfactants having a PEG moiety was seen to stabilize the cannabinoids to a surprisingly high degree, whereby degradation in the harsh environment in the gastrointestinal tract was limited.

In some embodiments of the invention, the one or more surfactants having a chemical structure that includes a PEG moiety is present in an amount of at least 20% by weight of the one or more liquid or solid self-emulsifying systems.

In some embodiments of the invention, the one or more surfactants having a chemical structure that includes a PEG moiety is present in an amount of at least 25% by weight of the one or more liquid or solid self-emulsifying systems.

In some embodiments of the invention, the one or more surfactants having a chemical structure that includes a PEG moiety is present in an amount of at least 30% by weight of the one or more liquid or solid self-emulsifying systems.

In some embodiments of the invention, the one or more surfactants having a chemical structure that includes a PEG moiety is present in an amount of at least 35% by weight of the one or more liquid or solid self-emulsifying systems.

In some embodiments of the invention, the one or more surfactants having a chemical structure that includes a PEG moiety is present in an amount of at least 40% by weight of the one or more liquid or solid self-emulsifying systems.

In some embodiments of the invention, the one or more surfactants having a chemical structure that includes a PEG moiety is present in an amount of at least 50% by weight of the one or more liquid or solid self-emulsifying systems.

In some embodiments of the invention, the one or more surfactants having a chemical structure that includes a PEG moiety is present in an amount of at least 60% by weight of the one or more liquid or solid self-emulsifying systems.

In some embodiments of the invention, the one or more surfactants having a chemical structure that includes a PEG moiety is present in an amount of 20 to 80% by weight of the one or more liquid or solid self-emulsifying systems.

In some embodiments of the invention, the one or more surfactants having a chemical structure that includes a PEG moiety is present in an amount of 25 to 75% by weight of the one or more liquid or solid self-emulsifying systems.

In some embodiments of the invention, the one or more surfactants having a chemical structure that includes a PEG moiety is present in an amount of 30 to 75% by weight of the one or more liquid or solid self-emulsifying systems.

In some embodiments of the invention, the one or more isolated or synthetic cannabinoids is present in a relative high amount by weight of the one or more liquid or solid self-emulsifying systems. This relative high amount was seen to be preferred in order to balance a high uptake in terms of plasma concentration and the necessity of the self-emulsifying systems to work in the best way. Additionally, a relative high presence of cannabinoids, such as CBD, in the SEDDS may be important in order to limit the content of SEDDS in the oral formulation.

In some embodiments of the invention, the one or more isolated or synthetic cannabinoids is present in an amount of at least 15% by weight of the one or more liquid or solid self-emulsifying systems.

In some embodiments of the invention, the one or more isolated or synthetic cannabinoids is present in an amount of at least 20% by weight of the one or more liquid or solid self-emulsifying systems.

In some embodiments of the invention, the one or more isolated or synthetic cannabinoids is present in an amount of at least 25% by weight of the one or more liquid or solid self-emulsifying systems.

In some embodiments of the invention, the one or more isolated or synthetic cannabinoids is present in an amount of at least 30% by weight of the one or more liquid or solid self-emulsifying systems.

In some embodiments of the invention, the one or more isolated or synthetic cannabinoids is present in an amount of at least 35% by weight of the one or more liquid or solid self-emulsifying systems.

In some embodiments of the invention, the one or more isolated or synthetic cannabinoids is present in an amount of at least 40% by weight of the one or more liquid or solid self-emulsifying systems.

In some embodiments of the invention, the one or more isolated or synthetic cannabinoids is present in an amount of 15 to 50% by weight of the one or more liquid or solid self-emulsifying systems.

In some embodiments of the invention, the one or more isolated or synthetic cannabinoids is present in an amount of 20 to 40% by weight of the one or more liquid or solid self-emulsifying systems.

In some embodiments of the invention, the one or more isolated or synthetic cannabinoids is present in an amount of 25 to 35% by weight of the one or more liquid or solid self-emulsifying systems.

In some embodiments of the invention, the one or more isolated or synthetic cannabinoids is present in an amount of 10 to 30% by weight of the tableted powder formulation.

In some embodiments of the invention, the one or more isolated or synthetic cannabinoids is present in an amount of 10 to 20% by weight of the tableted powder formulation.

In some embodiments of the invention, the one or more isolated or synthetic cannabinoids is present in an amount of at least 5% by weight of the tableted powder formulation.

In some embodiments of the invention, the one or more isolated or synthetic cannabinoids is present in an amount of at least 10% by weight of the tableted powder formulation.

In some embodiments of the invention, the one or more isolated or synthetic cannabinoids is present in an amount of at least 15% by weight of the tableted powder formulation.

In some embodiments of the invention, the one or more isolated or synthetic cannabinoids is present in an amount of at least 20% by weight of the tableted powder formulation.

In some embodiments of the invention, the one or more isolated or synthetic cannabinoids is present in an amount of at least 25% by weight of the tableted powder formulation.

In some embodiments of the invention, the one or more carrier systems is released from the orally dissolvable or chewable tableted powder formulation in the oral cavity.

In some embodiments of the invention, at least 90% of the one or more carrier systems is released from the orally dissolvable or chewable tableted powder formulation in the oral cavity within 5 minutes upon oral administration.

In some embodiments of the invention, at most 50% of the one or more isolated or synthetic cannabinoids is released from the one or more carrier systems after 10 minutes upon oral administration.

In some embodiments of the invention, at most 20% of the one or more isolated or synthetic cannabinoids is released from the one or more carrier systems after 10 minutes upon oral administration.

In some embodiments of the invention, the self-emulsifying system upon hydration forms an emulsion for delivery of the one or more cannabinoids to mucosal surfaces in the gastrointestinal tract.

In some embodiments of the invention, the self-emulsifying system upon hydration forms an emulsion for delivery of the one or more cannabinoids to mucosal surfaces in the small intestines of the gastrointestinal tract.

In some embodiments of the invention, the self-emulsifying system upon hydration forms an emulsion for delivery of the one or more cannabinoids to mucosal surfaces in the colon of the gastrointestinal tract.

In some embodiments of the invention, the one or more carrier systems provides stable conditions for delivery of the one or more cannabinoids to mucosal surfaces in the gastrointestinal tract. In some embodiments of the invention, the one or more carrier systems provides stable conditions for delivery of the one or more cannabinoids to mucosal surfaces in the stomach of the gastrointestinal tract.

In some embodiments of the invention, the one or more self-emulsifying systems comprises one or more liquid self-emulsifying systems.

In some embodiments of the invention, the one or more lipids comprises one or more oils.

In some embodiments of the invention, the one or more lipids comprises one or more oils comprising orange oil.

In some embodiments of the invention, the one or more lipids comprises one or more triglycerides.

In some embodiments of the invention, the one or more lipids comprises one or more triglycerides of vegetable origin.

In some embodiments of the invention, the one or more lipids comprises one or more oils selected from the group consisting of almond oil, castor oil, coconut oil, corn oil, cottonseed oil, linseed oil, olive oil, palm oil, peanut oil, rapeseed oil, safflower oil, sesame oil, soybean oil, sunflower oil, and combinations thereof.

In some embodiments of the invention, the one or more lipids comprises one or more triglycerides selected from one or more C4 to C14 triglycerides.

In some embodiments of the invention, the one or more lipids comprises one or more triglycerides comprising a partially hydrogenated vegetable oil.

In some embodiments of the invention, the one or more lipids comprises one or more triglycerides comprising a fully hydrogenated vegetable oil.

In some embodiments of the invention, the one or more lipids comprises one or more triglycerides comprising caprylic acid in an amount of 50 to 80% by weight.

In some embodiments of the invention, the one or more lipids comprises one or more triglycerides comprising capric acid in an amount of 20 to 45% by weight.

In some embodiments of the invention, the one or more lipids does not comprise a flavor oil.

In some embodiments of the invention, the one or more lipids comprises one or more lipophilic compounds selected from the group consisting of glyceryl caprylate, glyceryl caprate, glyceryl monocaprylate, glyceryl monooleate, glyceryl monostearate, glyceryl monolinoleate, polyglyceryl-3 dioleate, propylene glycol dicaprylocaprate, propylene glycol dilaurate, benzyl alcohol, alpha-tocopherol, isopropyl myristate, glycerol monocaprylocaprate, and combinations thereof.

In some embodiments of the invention, the one or more lipids comprises one or more lipophilic compounds selected from the group consisting of glyceryl caprylate mixed with glyceryl caprate (Type I), glyceryl caprylate mixed with glyceryl caprate (Type II), glyceryl monocaprylate (Type I), glyceryl monooleate (Type 40), glyceryl monooleate (Type 60), glyceryl monooleate (Type 90), glyceryl monostearate, glyceryl monolinoleate, polyglyceryl-3 dioleate, propylene glycol dicaprylocaprate, propylene glycol dilaurate, benzyl alcohol, alpha-tocopherol, isopropyl myristate, glycerol monocaprylocaprate, and combinations thereof.

In some embodiments of the invention, the one or more lipids comprises one or more lipophilic compounds having a HLB value of less than 6.

In some embodiments of the invention, the one or more lipids comprises one or more lipophilic compounds that are not triglycerides.

In some embodiments of the invention, the one or more lipids is present in an amount of 1 to 30% by weight of the orally dissolvable or chewable tableted powder formulation.

In some embodiments of the invention, the one or more lipids is present in an amount of 5 to 30% by weight of the orally dissolvable or chewable tableted powder formulation.

In some embodiments of the invention, the one or more lipids is present in an amount of 10 to 30% by weight of the orally dissolvable or chewable tableted powder formulation.

In some embodiments of the invention, the one or more lipids is present in an amount of 5 to 40% by weight of the one or more self-emulsifying systems.

In some embodiments of the invention, the one or more lipids is present in an amount of 10 to 40% by weight of the one or more self-emulsifying systems.

In some embodiments of the invention, the one or more lipids improves homogeneity of the one or more cannabinoids in the orally dissolvable or chewable tableted powder formulation.

In some embodiments of the invention, the one or more lipids is present in an amount of 10 to 300 mg in the orally dissolvable or chewable tableted powder formulation.

In some embodiments of the invention, the one or more lipids is present in an amount of 50 to 300 mg in the orally dissolvable or chewable tableted powder formulation.

In some embodiments of the invention, the one or more self-emulsifying systems comprises one or more solid self-emulsifying systems.

In some embodiments of the invention, the one or more waxes comprises a solid and/or a semi-solid material at 25 Degrees Celsius. In some embodiments, the one or more waxes comprises a solid and/or a semi-solid lipid.

Generally, the expression "solid self-emulsifying system" is intended to mean self-emulsifying systems that are solid and/or a semi-solid at 25 Degrees Celsius, and the expression "liquid self-emulsifying system" is intended to mean self-emulsifying systems that are liquid and/or a semi-liquid at 25 Degrees Celsius.

In some embodiments of the invention, the one or more waxes is present in an amount of 1 to 30% by weight of the orally dissolvable or chewable tableted powder formulation.

In some embodiments of the invention, the one or more waxes improves homogeneity of the one or more cannabinoids in the orally dissolvable or chewable tableted powder formulation.

In some embodiments of the invention, the one or more waxes is present in an amount of 10 to 300 mg in the orally dissolvable or chewable tableted powder formulation.

In some embodiments of the invention, the one or more waxes is present in an amount of 50 to 300 mg in the orally dissolvable or chewable tableted powder formulation.

In some embodiments of the invention, the one or more surfactants is having a HLB-value of more than 6.

In some embodiments of the invention, the one or more surfactants comprises one or more surfactants having a chemical structure that includes a polyethylene glycol (PEG) moiety being selected from the group consisting of sugar-lipid based surfactants with PEG modification, PEG containing polymer based surfactants, PEGylated emulsifiers, and combinations thereof.

In some embodiments of the invention, the one or more surfactants comprises one or more surfactants having a chemical structure that includes a polyethylene glycol (PEG) moiety being sugar-lipid based surfactants with PEG modification selected from the group consisting of polyoxyethylene (20) sorbitan monolaurate, polyoxyethylene (20) sorbitan monooleate, polyoxyethylene (20) sorbitan monopalmitate, polyoxyethylene (20) sorbitan monostearate, polyoxyethylene (20) sorbitan trioleate, and combinations thereof.

In some embodiments of the invention, the one or more surfactants comprises one or more surfactants having a chemical structure that includes a polyethylene glycol (PEG) moiety being PEG containing polymer based surfactants selected from the group consisting of poloxamer 124, poloxamer 188, poloxamer 338, poloxamer 407, and combinations thereof. All being tri block-copolymers of polyoxyethylene and polyoxypropylene glycol.

In some embodiments of the invention, the one or more surfactants comprises one or more surfactants having a chemical structure that includes a polyethylene glycol (PEG) moiety being PEGylated emulsifiers selected from the group consisting of d-alpha-tocopheryl polyethylene glycol succinate, d-alpha-tocopheryl PEG-1000 succinate, PEG-15 hydroxystearate, PEG-30 castor oil, PEG-32 lauroyl glycerides, PEG-32 stearoyl glycerides, PEG-35 castor oil, PEG-40 hydrogenated castor oil, PEG-6 lauroyl glycerides, PEG-6 linoleoyl glycerides, PEG-6 oleoyl glycerides, PEG-8 caprylic/capric glycerides, polyoxyl 20 cetostearyl ether, polyoxyethylenue-laurylether, polyoxyethylene-23-laurylether, and combinations thereof. In this context, the abbreviation "PEG-15" is intended to mean that 15 units of PEG is present. The same numbering applies to the other abbreviations, where the number after PEG indicates the number of units of "PEG" in the molecule when the number is 100 or lower. If the number after PEG is higher than 100, the number indicates the average molecular weight of the "PEG" chain in the molecule.

In some embodiments of the invention, the one or more surfactants comprises one or more surfactants having a chemical structure that includes a polyethylene glycol (PEG) moiety comprising d-alpha-tocopheryl polyethylene glycol succinate.

In some embodiments of the invention, the one or more surfactants comprises one or more surfactants having a chemical structure that includes a polyethylene glycol (PEG) moiety comprising polyoxyethylene-laurylether.

In some embodiments of the invention, the one or more surfactants comprises one or more surfactants having a chemical structure that includes a polyethylene glycol (PEG) moiety comprising polyoxyethylene-23-laurylether.

In some embodiments of the invention, the one or more surfactants comprises one or more surfactants having a chemical structure that includes a polyethylene glycol (PEG) moiety comprising poloxamer 188.

In some embodiments of the invention, the one or more surfactants is having a mean HLB-value of more than 6.

In some embodiments of the invention, the one or more surfactants is having a mean HLB-value of more than 9.

In some embodiments of the invention, the one or more surfactants is selected from the group consisting of PEG-35 castor oil, PEG-6 oleoyl glycerides, PEG-6 linoleoyl glycerides, PEG-8 caprylic/capric glyceride, sorbitan monolaurate, sorbitan monooleate, polyoxyethylene (20) sorbitan monolaurate, polyoxyethylene (60) sorbitan monostearate, polyoxyethylene (80) sorbitan monooleate, lauroylpoloxyl-32 glycerides, stearoyl polyoxyl-32 glycerides, polyoxyl-32 stearate, propylene glycol mono laurate, propylene glycol di laurate, and mixtures and combinations thereof.

In some embodiments of the invention, the one or more self-emulsifying systems further comprises one or more co-solvents.

In some embodiments of the invention, the one or more self-emulsifying systems further comprises one or more co-solvents selected from the group consisting of polyglyceryl-3 dioleate, 1,2-propandiol, polyethylene glycol 300, polyethylene glycol 400, diethylene glycol monoethyl ether, and mixtures and combinations thereof.

In some embodiments of the invention, the one or more self-emulsifying systems further comprises one or more hydrophilic solvents.

In some embodiments of the invention, the one or more self-emulsifying systems further comprises one or more hydrophilic solvents in an amount of at least 5% by weight of the by weight of the one or more liquid or solid self-emulsifying systems.

In some embodiments of the invention, the one or more self-emulsifying systems further comprises one or more hydrophilic solvents in an amount of at least 10% by weight of the by weight of the one or more liquid or solid self-emulsifying systems.

In some embodiments of the invention, the one or more self-emulsifying systems further comprises one or more hydrophilic solvents in an amount of at least 20% by weight of the by weight of the one or more liquid or solid self-emulsifying systems.

In some embodiments of the invention, the one or more self-emulsifying systems further comprises one or more hydrophilic solvents in an amount of 10 to 50% by weight of the by weight of the one or more liquid or solid self-emulsifying systems.

In some embodiments of the invention, the one or more self-emulsifying systems further comprises one or more hydrophilic solvents in an amount of 10 to 40% by weight of the by weight of the one or more liquid or solid self-emulsifying systems.

In some embodiments of the invention, the one or more self-emulsifying systems further comprises one or more hydrophilic solvents in an amount of 10 to 30% by weight of the by weight of the one or more liquid or solid self-emulsifying systems.

In some embodiments of the invention, the one or more self-emulsifying systems further comprises one or more hydrophilic solvents selected from the group consisting of propylene glycol, acetyl tributyl citrate, acetyl triethyl citrate, dimethyl sulfoxide, ethanol, ethyl oleate, glycerol triacetate (a highly purified version preferred), diethylene glycol monoethyl ether, polyethylene glycol 200, polyethylene glycol 300, polyethylene glycol 400, polyethylene glycol 600, propan-2-ol, glycerol, triethyl citrate, and combinations thereof.

In some embodiments of the invention, the one or more self-emulsifying systems further comprises one or more hydrophilic solvents comprising propylene glycol.

In some embodiments of the invention, the one or more-emulsifying systems further comprises one or more solubilizers.

In some embodiments of the invention, the one or more self-emulsifying systems further comprises one or more solubilizers selected from the group consisting of lauroylpoloxyl-32 glycerides; stearoyl polyoxyl-32 glycerides; Polyoxyl-32 stearate; synthetic copolymer of ethylene oxide (80) and propylene oxide (27); polyvinyl caprolactam-polyvinyl acetate-polyethylene glycol graft co-polymer; alpha-, beta- or gamma cyclodextrins and derivatives thereof; pea proteins (globulins, albumins, glutelins proteins); and mixtures and combinations thereof.

In some embodiments of the invention, the orally dissolvable or chewable tableted powder formulation further comprises one or more permeation enhancers.

In some embodiments of the invention, the orally dissolvable or chewable tableted powder formulation further comprises antioxidants.

In some embodiments of the invention, the orally dissolvable or chewable tableted powder formulation further comprises preservatives.

In some embodiments of the invention, the one or more surfactants comprises one or more surfactants having a chemical structure that does not include a polyethylene glycol (PEG) moiety. These may also be denoted "non-PEG" surfactants".

In the present context "moiety" is given the common understanding within organic chemistry, i.e., the polyethylene glycol moiety is part of a molecule and can be identified as such within the molecule. This may be as a tail of the surfactant, being a side group of the surfactant, being part of a chain within the surfactant, etc. In the present context, the wording "the one or more surfactants comprises one or more surfactants having a chemical structure that does not include a polyethylene glycol (PEG) moiety" specifically implies that a "PEG" moiety is not present in the molecule.

One of the advantages of including one or more surfactants having a chemical structure that does not include a polyethylene glycol (PEG) moiety as part of self-emulsifying systems according to the invention is that in vivo uptake of cannabinoids was seen to be surprisingly increased, particularly at long time scales, such as more than 240 minutes after administration in vivo in rats. This was highly unexpected since a low content of PEG in the surfactant was theoretically expected to result in pronounced degradation of the surfactant, which was expected to result in a low cell uptake due to a lower content of surfactant following degradation. In fact, it was seen that degradation was increased as expected. Despite this, the in vivo uptake was very high at long time scales as seen for high level plasma concentration of cannabinoids in rats relatively long time after intake.

Specifically, it was seen that the in vivo uptake of cannabinoids by including a surfactant without a polyethylene glycol (PEG) moiety as part of self-emulsifying systems was especially pronounced at long time scales as cannabinoid plasma concentration was remained at a very high level as a function of time compared to other surfactants, such as surfactants including a PEG moiety, when applied in an in vivo test set-up with rats. Also, the plasma concentration was at the same level as the reference, Epidiolex®, in terms of uptake of cannabinoids at long time scales.

However, not only was a surprisingly high uptake seen at long time scales. Also, an initial high uptake was seen at short time scales, much higher than Epidiolex®.

Additionally, an overall uptake of cannabinoids was seen to be very high as a function of time by including a surfactant without a polyethylene glycol (PEG) moiety as part of self-emulsifying systems. Compared to the reference, Epidiolex®, the overall uptake of cannabinoids, including uptake at short time scales and at long time scales, was on average much higher. Also, compared to PEG containing surfactants, including a surfactant without a polyethylene glycol (PEG) moiety (ie. a "non-PEG" surfactant") as part of a self-emulsifying system the overall level of uptake was much higher, including uptake at short time scales and at long time scales. This was highly surprising.

In some embodiments of the invention, the one or more surfactants comprises one or more surfactants having a chemical structure that does not include a polyethylene glycol (PEG) moiety, the one or more surfactants having a chemical structure that does not include a PEG moiety being present in an amount of 0.1 to 20% by weight of the one or more liquid or solid self-emulsifying systems.

In some embodiments of the invention, the one or more surfactants comprises one or more surfactants having a chemical structure that does not include a polyethylene glycol (PEG) moiety, the one or more surfactants having a chemical structure that does not include a PEG moiety being present in an amount of 0.1 to 10% by weight of the one or more liquid or solid self-emulsifying systems.

In some embodiments of the invention, the one or more surfactants comprises one or more surfactants having a chemical structure that does not include a polyethylene glycol (PEG) moiety, the one or more surfactants having a chemical structure that does not include a PEG moiety being present in an amount of less than 10% by weight of the one or more liquid or solid self-emulsifying systems.

In some embodiments of the invention, the one or more surfactants comprises one or more surfactants having a chemical structure that does not include a polyethylene glycol (PEG) moiety, the one or more surfactants having a chemical structure that does not include a PEG moiety being present in an amount of less than 5% by weight of the one or more liquid or solid self-emulsifying systems.

In some embodiments of the invention, the one or more surfactants comprises one or more surfactants having a chemical structure that does not include a polyethylene glycol (PEG) moiety, the one or more surfactants having a chemical structure that does not include a PEG moiety being present in an amount of less than 2% by weight of the one or more liquid or solid self-emulsifying systems.

In some embodiments of the invention, the one or more surfactants comprises one or more surfactants having a chemical structure that does not include a polyethylene glycol (PEG) moiety, the one or more surfactants having a chemical structure that does not include a PEG moiety being present in an amount of less than 1% by weight of the one or more liquid or solid self-emulsifying systems.

In some embodiments of the invention, the one or more surfactants comprises one or more surfactants having a chemical structure that does not include a polyethylene glycol (PEG) moiety being selected from the group consisting of monoglycerides, sugar-lipid based surfactants, and combinations thereof.

In some embodiments of the invention, the one or more surfactants comprises one or more surfactants having a chemical structure that does not include a polyethylene glycol (PEG) moiety being selected from the group consisting of decaglycerol mono- and dioleate, hexaglycerol octastearate, polyglycerol esters of oleic acid, propylene glycol monocaprylate, propylene glycol monolaurate, triglycerol monooleate, polyglyceryl-4 oleyl ether olivate, polyglyceryl-4 laurate/sebacate, polyglyceryl-4 caprylate/caprate, and combinations thereof.

In some embodiments of the invention, the one or more surfactants comprises one or more surfactants having a chemical structure that does not include a polyethylene glycol (PEG) moiety being selected from the group consisting of decaglycerol mono- and dioleate, hexaglycerol octastearate, polyglycerol esters of oleic acid, propylene glycol monocaprylate (Type I), propylene glycol monocaprylate (Type II), propylene glycol monolaurate (Type I), propylene glycol monolaurate (Type II) triglycerol monooleate, polyglyceryl-4 oleyl ether olivate, polyglyceryl-4 laurate/sebacate, polyglyceryl-4 caprylate/caprate, and combinations thereof.

In some embodiments of the invention, the one or more surfactants comprises one or more surfactants having a chemical structure that does not include a polyethylene glycol (PEG) moiety being selected from the group consisting of sorbitan monolaurate, sorbitan monooleate, sorbitan monopalmitate, sorbitan monostearate, sorbitan trioleate, sucrose palmitate, sucrose stearate, and combinations thereof.

In some embodiments of the invention, the one or more surfactants comprises one or more surfactants having a chemical structure that does not include a polyethylene glycol (PEG) moiety comprising polyglyceryl-4 laurate/sebacate and/or polyglyceryl-4 caprylate/caprate.

In some embodiments, polyglyceryl-4 laurate/sebacate and/or polyglyceryl-4 caprylate/caprate may contain water.

In some embodiments of the invention, the one or more surfactants comprises one or more surfactants having a chemical structure that does not include a polyethylene glycol (PEG) moiety comprising ascorbic acid palmitate.

In some embodiments of the invention, the one or more surfactants comprises one or more surfactants having a chemical structure that does not include a polyethylene glycol (PEG) moiety comprising sodium lauryl sulfate.

In some embodiments of the invention, the one or more surfactants comprises one or more surfactants having a chemical structure that does not include a polyethylene glycol (PEG) moiety comprising soy phosphatidylcholine.

In some embodiments of the invention, the one or more surfactants substantially does not comprise one or more surfactants having a chemical structure that does not include a polyethylene glycol (PEG) moiety.

In some embodiments of the invention, the one or more surfactants does not comprise one or more surfactants having a chemical structure that does not include a polyethylene glycol (PEG) moiety.

In some embodiments of the invention, the one or more isolated or synthetic cannabinoids is selected from the group consisting of cannabidiol (CBD), cannabidiolic acid (CBDA), cannabidivarin (CBDV), and combinations thereof.

In some embodiments of the invention, the one or more isolated or synthetic cannabinoids is selected from the group consisting of tetrahydrocannabinol (THC), tetrahydrocannabinolic acid (THCA), tetrahydrocannabivarin (THCV), and combinations thereof.

In some embodiments of the invention, the one or more isolated or synthetic cannabinoids comprises cannabidiol (CBD).

In some embodiments of the invention, the one or more isolated or synthetic cannabinoids is selected from the group consisting of cannabidiol (CBD), cannabidiolic acid (CBDA), tetrahydrocannabinol (THC), tetrahydrocannabinolic acid (THCA), cannabigerol (CBG), cannabichromene (CBC), cannabinol (CBN), cannabielsoin (CBE), iso-tetrahydrocannabinol (iso-THC), cannabicyclol (CBL), cannabicitran (CBT), cannabivarin (CBV), tetrahydrocannabivarin (THCV), cannabidivarin (CBDV), cannabichromevarin (CBCV), cannabigerovarin (CBGV), cannabigerol monomethyl ether (CBGM), and combinations thereof.

In some embodiments of the invention, the one or more isolated or synthetic cannabinoids is an isolated cannabinoid.

In some embodiments of the invention, the one or more isolated or synthetic cannabinoids is a synthetic cannabinoid.

In some embodiments of the invention, the one or more isolated or synthetic cannabinoids is not a cannabinoid distillate with a cannabinoid purity of more than 80%.

In some embodiments of the invention, the purity of isolated cannabinoids is more than 95%. In some embodiments of the invention, the purity of isolated cannabinoids is more than 98%. In some embodiments of the invention, the purity of isolated cannabinoids is more than 99%.

In some embodiments of the invention, the one or more isolated or synthetic cannabinoids is not a cannabinoid extract with a cannabinoid purity of less than 80%.

In some embodiments of the invention, the one or more isolated or synthetic cannabinoids is present in an amount of at least 10 mg in the orally dissolvable or chewable tableted powder formulation.

In some embodiments of the invention, the one or more isolated or synthetic cannabinoids is present in an amount of at least 20 mg in the orally dissolvable or chewable tableted powder formulation.

In some embodiments of the invention, the one or more isolated or synthetic cannabinoids is present in an amount of at least 30 mg in the orally dissolvable or chewable tableted powder formulation.

In some embodiments of the invention, the one or more isolated or synthetic cannabinoids is present in an amount of at least 40 mg in the orally dissolvable or chewable tableted powder formulation.

In some embodiments of the invention, the one or more isolated or synthetic cannabinoids is present in an amount of at least 60 mg in the orally dissolvable or chewable tableted powder formulation.

In some embodiments of the invention, the one or more isolated or synthetic cannabinoids is present in an amount of at least 75 mg in the orally dissolvable or chewable tableted powder formulation.

In some embodiments of the invention, the one or more isolated or synthetic cannabinoids is present in an amount of at least 100 mg in the orally dissolvable or chewable tableted powder formulation.

In some embodiments of the invention, the one or more isolated or synthetic cannabinoids is present in an amount of at least 150 mg in the orally dissolvable or chewable tableted powder formulation.

In some embodiments of the invention, the one or more isolated or synthetic cannabinoids is present in an amount of at least 200 mg in the orally dissolvable or chewable tableted powder formulation.

In some embodiments of the invention, the one or more isolated or synthetic cannabinoids is present in an amount of at least 250 mg in the orally dissolvable or chewable tableted powder formulation.

In some embodiments of the invention, the one or more isolated or synthetic cannabinoids is present in an amount of at least 300 mg in the orally dissolvable or chewable tableted powder formulation.

In some embodiments of the invention, the one or more isolated or synthetic cannabinoids is present in an amount of at least 400 mg in the orally dissolvable or chewable tableted powder formulation.

In some embodiments of the invention, the one or more isolated or synthetic cannabinoids is present in an amount of at least 500 mg in the orally dissolvable or chewable tableted powder formulation.

In some embodiments of the invention, the one or more isolated or synthetic cannabinoids is present in an amount of at least 600 mg in the orally dissolvable or chewable tableted powder formulation.

In some embodiments of the invention, the one or more isolated or synthetic cannabinoids is present in an amount of at least 300 mg in the orally dissolvable or chewable tableted powder formulation.

In some embodiments of the invention, the one or more carrier systems comprises one or more solid carriers selected from the group consisting of silica, microcrystalline cellulose, cellulose, silicified microcrystalline cellulose, clay, talc, starch, pregelatinized starch, calcium carbonate, dicalcium phosphate, modified calcium carbonate, magnesium carbonate, magnesium aluminometasilicate, hyper porous silica, and mixtures thereof In some embodiments of the invention, the one or more carrier systems comprises one or more microcrystalline cellulose carriers.

In some embodiments of the invention, the one or more carrier systems comprises one or more modified calcium carbonate carriers.

In some embodiments of the invention, the one or more carrier systems comprises one or more silica carriers.

In some embodiments of the invention, the one or more carrier systems comprises one or more mesoporous silica carriers.

In some embodiments of the invention, the one or more carrier systems comprises one or more mesoporous silica carriers comprising magnesium aluminometasilicate.

In some embodiments of the invention, the one or more carrier systems comprises one or more mesoporous silica carriers comprising dicalcium phosphate.

In some embodiments of the invention, the one or more carrier systems comprises one or more solid carriers having an average particle size of 20 to 200 microns.

In some embodiments of the invention, the one or more carrier systems comprises one or more solid carriers having an average particles size of 30 to 150 microns.

In some embodiments of the invention, the one or more carrier systems is present in an amount of above 10% by weight of the orally dissolvable or chewable tableted powder formulation.

In some embodiments of the invention, the one or more carrier systems is present in an amount of above 20% by weight of the orally dissolvable or chewable tableted powder formulation.

In some embodiments of the invention, the one or more carrier systems is present in an amount of 30 to 1500 mg in the orally dissolvable or chewable tableted powder formulation.

In some embodiments of the invention, the one or more carrier systems comprises one or more solid carriers having an average pore volume above 1.0 $cm^3/g$.

In some embodiments of the invention, the one or more carrier systems comprises one or more solid carriers having an average pore volume above 1.5 $cm^3/g$.

In some embodiments of the invention, the one or more carrier systems comprises one or more solid carriers having an average density above 50 g/L.

In some embodiments of the invention, the one or more carrier systems comprises one or more solid carriers having an average density from 50 to 400 g/L.

In some embodiments of the invention, the one or more carrier systems comprises one or more solid carriers having an average density from 150 to 400 g/L.

In some embodiments of the invention, the one or more carrier systems comprises one or more solid carriers that is not characterized as a powder flow promotor.

In some embodiments of the invention, the one or more liquid or solid self-emulsifying systems is present in an amount of 30 to 800 mg in the orally dissolvable or chewable tableted powder formulation.

In some embodiments of the invention, the one or more liquid or solid self-emulsifying systems is present in an amount of 30 to 300 mg in the orally dissolvable or chewable tableted powder formulation.

In some embodiments of the invention, the one or more isolated or synthetic cannabinoids is fully contained in the one or more liquid or solid self-emulsifying systems.

In some embodiments of the invention, the orally dissolvable or chewable tableted powder formulation comprises one or more cannabinoids separate from the one or more liquid or solid self-emulsifying systems.

In some embodiments of the invention, the one or more water-soluble agents is present in an amount of 30-80% by weight of the tableted powder formulation.

In some embodiments of the invention, the one or more water-soluble agents is present in an amount of 40-80% by weight of the tableted powder formulation.

In some embodiments of the invention, the one or more water-soluble agents comprises one or more sugar alcohol particles.

In some embodiments of the invention, the one or more water-soluble agents comprises one or more sugar alcohol particles selected from the group consisting of sorbitol, erythritol, xylitol, lactitol, maltitol, mannitol, isomalt, and combinations thereof.

In some embodiments of the invention, the one or more water-soluble agents comprises one or more sugar alcohol particles comprising non-directly compressible (non-DC) sugar alcohol particles and directly compressible (DC) sugar alcohol particles.

In some embodiments of the invention, the one or more water-soluble agents comprises one or more sugar alcohol particles comprising non-directly compressible (non-DC) sugar alcohol particles and directly compressible (DC) sugar alcohol particles in a ratio of non-DC to DC between 0.2 and 1.2.

In some embodiments of the invention, the one or more water-soluble agents comprises one or more sugar alcohol particles comprising non-directly compressible (non-DC)

sugar alcohol particles and directly compressible (DC) sugar alcohol particles in a ratio of non-DC to DC between 0.3 and 0.7.

In some embodiments of the invention, the orally dissolvable or chewable tableted powder formulation is associated with an improved mouthfeel.

In some embodiments of the invention, the orally dissolvable or chewable tableted powder formulation is associated with an improved mouthfeel comprising a less sandy mouthfeel.

In some embodiments of the invention, the orally dissolvable or chewable tableted powder formulation is associated with an improved mouthfeel comprising a less creaking sound upon mastication of the orally dissolvable or chewable tableted powder formulation.

In some embodiments of the invention, the orally dissolvable or chewable tableted powder formulation is associated with an improved mouthfeel by the one or more carrier systems compared to separately added carriers not comprising one or more liquid or solid self-emulsifying systems.

In some embodiments of the invention, the orally dissolvable or chewable tableted powder formulation is associated with an improved mouthfeel by the presence of the one or more water-soluble agents.

In some embodiments of the invention, the orally dissolvable or chewable tableted powder formulation further comprises one or more disintegrants.

In some embodiments of the invention, the orally dissolvable or chewable tableted powder formulation further comprises further comprising one or more disintegrants selected from the group consisting of sodium croscarmellose, crospovidone, sodium starch glycolate, and combinations thereof.

In some embodiments of the invention, the orally dissolvable or chewable tableted powder formulation further comprises at least one dissolution modifier selected from the group consisting of acacia, agar, alginic acid or a salt thereof, carbomer, carboxymethylcellulose, carrageenan, cellulose, chitosan, copovidone, cyclodextrins, ethylcellulose, gelatin, guar gum, hydroxyethyl cellulose, hydroxyethyl methylcellulose, hydroxypropyl cellulose, hypromellose, inulin, methylcellulose, pectin, polycarbophil or a salt thereof, polyvinyl alcohol, pullulan, starch, tragacanth, trehalose, xanthan gum and mixtures thereof.

In some embodiments of the invention, the orally dissolvable or chewable tableted powder formulation further comprises at least one dissolution modifier in an amount of 3 to 20% by weight of the orally dissolvable or chewable tableted powder formulation.

In some embodiments of the invention, the orally dissolvable or chewable tableted powder formulation further comprises one or more organic acids.

In some embodiments of the invention, the powder formulation further comprises one or more organic fruit acids. The organic fruit acids according to the invention may support fruit taste. The organic fruit acids according to the invention may also support sweetener taste.

In some embodiments of the invention, the one or more flavors is present in an amount of 0.1 to 10% by weight of the orally dissolvable or chewable tableted powder formulation.

In some embodiments of the invention, the one or more self-emulsifying systems comprises the one or more isolated or synthetic cannabinoids and one or more lipids in a weight ratio of cannabinoid to lipid of 10:1 to 1:10.

In some embodiments of the invention, the one or more self-emulsifying systems comprises the one or more isolated or synthetic cannabinoids and one or more lipids in a weight ratio of cannabinoid to lipid of 10:1 to 1:5.

In some embodiments of the invention, the one or more self-emulsifying systems comprises the one or more isolated or synthetic cannabinoids and one or more lipids in a weight ratio of cannabinoid to lipid of 8:1 to 1:2.

In some embodiments of the invention, the one or more self-emulsifying systems comprises the one or more isolated or synthetic cannabinoids and one or more lipids in a weight ratio of cannabinoid to lipid of 4:1 to 1:2.

In some embodiments of the invention, the one or more self-emulsifying systems comprises the one or more isolated or synthetic cannabinoids and one or more lipids in a weight ratio of cannabinoid to lipid of 3:1 to 1:1.

In some embodiments of the invention, the one or more self-emulsifying systems comprises the one or more isolated or synthetic cannabinoids and one or more waxes in a weight ratio of cannabinoid to wax of 10:1 to 1:10.

In some embodiments of the invention, the one or more self-emulsifying systems comprises the one or more isolated or synthetic cannabinoids and one or more waxes in a weight ratio of cannabinoid to wax of 10:1 to 1:5.

In some embodiments of the invention, the one or more self-emulsifying systems comprises the one or more isolated or synthetic cannabinoids and one or more waxes in a weight ratio of cannabinoid to wax of 8:1 to 1:2.

In some embodiments of the invention, the one or more self-emulsifying systems comprises the one or more isolated or synthetic cannabinoids and one or more waxes in a weight ratio of cannabinoid to wax of 4:1 to 1:2.

In some embodiments of the invention, the one or more self-emulsifying systems comprises the one or more isolated or synthetic cannabinoids and one or more waxes in a weight ratio of cannabinoid to wax of 3:1 to 1:1.

In some embodiments of the invention, the one or more carrier systems comprises one or more solid carriers and the one or more carrier systems comprises the one or more liquid or solid self-emulsifying systems in a weight ratio of solid carrier to liquid or solid self-emulsifying system of 2:8 to 8:2.

In some embodiments of the invention, the one or more carrier systems comprises one or more solid carriers and the one or more carrier systems comprises the one or more liquid or solid self-emulsifying systems in a weight ratio of solid carrier to liquid or solid self-emulsifying system of 4:6 to 6:4.

In some embodiments of the invention, the one or more liquid or solid self-emulsifying systems loaded with cannabinoids in an amount of at least 10% by weight of the tableted powder formulation comprises at least two separate liquid or solid self-emulsifying systems.

In some embodiments of the invention, a first liquid or solid self-emulsifying system comprises one or more surfactants having a chemical structure that includes a polyethylene glycol (PEG) moiety, and a second liquid or solid self-emulsifying system comprises one or more surfactant having a chemical structure that does not have a polyethylene glycol (PEG) moiety.

In some embodiments of the invention, the one or more surfactants having a chemical structure that includes a polyethylene glycol (PEG) moiety in the first liquid or solid self-emulsifying system is present in an amount of at least 20% by weight of the first liquid or solid self-emulsifying system.

In some embodiments of the invention, the one or more surfactants having a chemical structure that does not include a polyethylene glycol (PEG) moiety in the second liquid or solid self-emulsifying system is present in an amount of at least 5% by weight of the second liquid or solid self-emulsifying system.

In some embodiments of the invention, the first liquid or solid self-emulsifying system is located in a first compartment or module of the orally dissolvable or chewable tableted powder formulation, and a second compartment or module of the orally dissolvable or chewable tableted powder formulation comprises the second liquid or solid self-emulsifying system.

In some embodiments of the invention, the orally dissolvable or chewable tableted powder formulation is an orally dissolvable tablet.

In some embodiments of the invention, the orally dissolvable or chewable tableted powder formulation is an orally dissolvable tablet disintegrating in the oral cavity within 2 minutes upon oral administration.

In some embodiments of the invention, the orally dissolvable or chewable tableted powder formulation is a chewable tablet.

In some embodiments of the invention, the orally dissolvable or chewable tableted powder formulation is a lozenge comprising particulate ingredients.

In some embodiments of the invention, the orally dissolvable or chewable tableted powder formulation comprises gum base.

In some embodiments of the invention, the orally dissolvable or chewable tableted powder formulation is a compressed chewing gum tablet.

In some embodiments of the invention, the unit weight of the orally dissolvable or chewable tableted powder formulation is from 400 to 2000 mg.

In another aspect of the invention, there is provided an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  i) at least one or more surfactants, one or more lipids and one or more isolated or synthetic cannabinoids when the self-emulsifying system is a liquid self-emulsifying system, and
  ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein the one or more surfactants comprises one or more surfactants having a chemical structure that includes a polyethylene glycol (PEG) moiety.

In another aspect of the invention, there is provided an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  i) at least one or more surfactants, one or more lipids and one or more isolated or synthetic cannabinoids when the self-emulsifying system is a liquid self-emulsifying system, and
  ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and one or more flavors, wherein said one or more self-emulsifying systems is stable at a pH of about 1-4 and operable to gastrointestinal tract delivery of the one or more cannabinoids upon release of the one or more carrier systems in the oral cavity.

In this aspect of the invention, the orally dissolvable or chewable powder formulation may be further defined according to any of the preceding embodiments.

In another aspect of the invention, there is provided a stick pack comprising an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  i) at least one or more surfactants, one or more lipids and one or more isolated or synthetic cannabinoids when the self-emulsifying system is a liquid self-emulsifying system, and
  ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein the one or more surfactants comprises one or more surfactants having a chemical structure that includes a polyethylene glycol (PEG) moiety.

In another aspect of the invention, there is provided a stick pack comprising an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  i) at least one or more surfactants, one or more lipids and one or more isolated or synthetic cannabinoids when the self-emulsifying system is a liquid self-emulsifying system, and
  ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein said one or more self-emulsifying systems is stable at a pH of about 1-4 and operable to gastrointestinal tract delivery of the one or more cannabinoids upon release of the one or more carrier systems in the oral cavity.

In this aspect of the invention, the unit weight of the orally dissolvable or chewable powder formulation is from 400 to 2000 mg.

Also, in this aspect of the invention, the stick pack may be further defined according to any of the preceding embodiments.

In another aspect of the invention, there is provided a sachet comprising an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  - i) at least one or more surfactants, one or more lipids and one or more isolated or synthetic cannabinoids when the self-emulsifying system is a liquid self-emulsifying system, and
  - ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein the one or more surfactants comprises one or more surfactants having a chemical structure that includes a polyethylene glycol (PEG) moiety.

In another aspect of the invention, there is provided a sachet comprising an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  - i) at least one or more surfactants, one or more lipids and one or more isolated or synthetic cannabinoids when the self-emulsifying system is a liquid self-emulsifying system, and
  - ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein said one or more self-emulsifying systems is stable at a pH of about 1-4 and operable to gastrointestinal tract delivery of the one or more cannabinoids upon release of the one or more carrier systems in the oral cavity.

In this aspect of the invention, the unit weight of the orally dissolvable or chewable powder formulation is from 400 to 2000 mg.

Also, in this aspect of the invention, the sachet may be further defined according to any of the preceding embodiments.

In another aspect of the invention, there is provided a pouch comprising an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  - i) at least one or more surfactants, one or more lipids and one or more isolated or synthetic cannabinoids when the self-emulsifying system is a liquid self-emulsifying system, and
  - ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein the one or more surfactants comprises one or more surfactants having a chemical structure that includes a polyethylene glycol (PEG) moiety.

In another aspect of the invention, there is provided a pouch comprising an orally dissolvable or chewable powder formulation comprising:
- one or more carrier systems comprising one or more liquid or solid self-emulsifying systems loaded with cannabinoids in an amount of at least 10% by weight of the powder formulation; the one or more self-emulsifying systems including:
  - i) at least one or more surfactants, one or more lipids and one or more isolated or synthetic cannabinoids when the self-emulsifying system is a liquid self-emulsifying system, and
  - ii) at least one or more surfactants, one or more waxes and one or more isolated or synthetic cannabinoids when the self-emulsifying system is a solid self-emulsifying system;
- one or more water-soluble agents in an amount of 20-80% by weight of the powder formulation; and
- one or more flavors, wherein said one or more self-emulsifying systems is stable at a pH of about 1-4 and operable to gastrointestinal tract delivery of the one or more cannabinoids upon release of the one or more carrier systems in the oral cavity.

In this aspect of the invention, the unit weight of the orally dissolvable or chewable powder formulation is from 400 to 2000 mg.

Also, in this aspect of the invention, the pouch may be further defined according to any of the preceding embodiments.

In another aspect of the invention, there is provided a capsule formulation comprising:
- one or more carrier systems comprising one or more liquid or solid self-emulsifying systems loaded with cannabinoids in an amount of at least 10% by weight of the formulation; the one or more self-emulsifying systems including:
  - i) at least one or more surfactants, one or more lipids and one or more isolated or synthetic cannabinoids when the self-emulsifying system is a liquid self-emulsifying system, and
  - ii) at least one or more surfactants, one or more waxes and one or more isolated or synthetic cannabinoids when the self-emulsifying system is a solid self-emulsifying system;
- one or more water-soluble agents in an amount of 20-80% by weight of the formulation; and
- one or more flavors, wherein the one or more surfactants comprises one or more surfactants having a chemical structure that includes a polyethylene glycol (PEG) moiety.

In another aspect of the invention, there is provided a capsule formulation comprising:
- one or more carrier systems comprising one or more liquid or solid self-emulsifying systems loaded with cannabinoids in an amount of at least 10% by weight of the formulation; the one or more self-emulsifying systems including:
  - i) at least one or more surfactants, one or more lipids and one or more isolated or synthetic cannabinoids when the self-emulsifying system is a liquid self-emulsifying system, and ii) at least one or more surfactants, one or more waxes and one or more isolated or synthetic cannabinoids when the self-emulsifying system is a solid self-emulsifying system;

one or more water-soluble agents in an amount of 20-80% by weight of the formulation; and one or more flavors, wherein said one or more self-emulsifying systems is stable at a pH of about 1-4 and operable to gastrointestinal tract delivery of the one or more cannabinoids upon release of the one or more carrier systems in the oral cavity.

In some embodiments of the invention, the capsule comprises an orally dissolvable or chewable powder formulation.

DETAILED DESCRIPTION OF THE INVENTION

The verb "to comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one". Additionally, the words "a" and "an" when used in the present document in connection with the word comprising or containing denote "one or more." The expression "one or more" is intended to mean one, two, three or more.

As used herein, the term "approximately" or "about" in reference to a number are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value).

As used herein, the term "%" and "percent" refers to percent by weight, unless otherwise is stated.

The term "particle size" relates to the ability of the particles to move through or be retained by sieve holes of a specific size. As used herein, the term "particle size" refers to the average particle size as determined according to European Pharmacopoeia 9.1 when using test method 2.9.38 particle size distribution estimation by analytical sieving, unless otherwise specifically is mentioned.

The term "particle" or similar wording is intended to denote a single, discrete composition of solid matter, such as a granule or individual elements in powder, having a certain size that may deviate considerable.

In the present context the term "release" refers to the released substance being liberated from the solid dosage form or the released carrier system being liberated from the solid dosage form. In some embodiments, the process of releasing a substance corresponds to the substance being dissolved in saliva or mucosa. The term "release" in the present context is intended to mean tested under "in vivo" conditions, if not stated otherwise. In the present context, when the solid dosage form is masticated, "in vivo" conditions is intended to mean that a sample is masticated with a chewing frequency of 60 chews pr. minute for a certain period of time in a test panel of 8 test persons, if not stated otherwise. These test persons abstain from eating and drinking at least 30 minutes before initiation of any test. The test persons are healthy persons appointed on an objective basis according to specified requirements.

By the phrase "texture" is meant a qualitative measure of the properties of the solid dosage form and of the overall mouthfeel experienced by the user during use. Thus, the term "texture" encompasses measurable quantities such as hardness as well as more subjective parameters related to the feel experienced by a user, such as a sandy feeling upon or after mastication of the product.

The term "sustained release" or "extended release" is herein intended to mean prolonged release over time. The term "rapid release" or "quick release" or "high release" is herein intended to mean a higher content released for a given period of time. The term "controlled release" is intended to mean a release of a substance or the carrier system from a solid dosage form by the aid of active use of the solid dosage form in the oral cavity of the subject, whereby the active use is controlling the amount of substance or carrier system released.

A "self-emulsifying agent" is an agent which will form an emulsion when presented with an alternate phase with a minimum energy requirement. In contrast, an emulsifying agent, as opposed to a self-emulsifying agent, is one requiring additional energy to form an emulsion.

Due to the poor solubility of certain active ingredients in physiological fluids, it is an unmet need to solubilize cannabinoids upon mixture with the body physiological fluids to facilitate bio-absorption. To overcome low bioavailability, various lipid-based drug delivery systems and self-emulsifying systems have been developed. Lipid-based delivery systems and particularly self-emulsifying drug delivery systems (SEDDS) have been demonstrated to increase the solubility, dissolution and bioavailability of many insoluble active ingredients.

Particular challenges are considered to arise in formulating solid dosage forms with SEDDS. For instance, challenges may arise with obtaining a homogenous mixture where variations are avoided and a safe and convenient delivery may be obtained. Also, the general formulation of the solid dosage forms offering convenience to the user need not be compromised which is often the case if precaution is not taken, such as in cases where a high load of active ingredients is needed.

Particularly with respect to SEDDS, the formulation of the present invention may provide some clear benefits, both allowing a higher load of active ingredients and at the same time offer improved sensorics properties of the formulation during use. Other advantages are also present.

Importantly, the presence of SEDDS or at least a self-emulsifying agent was seen to act in synergy with the formulation of the present invention. The presence of SEDDS or at least a self-emulsifying agent was seen to further increase the uptake of the active ingredients through mucosal surfaces, such as the gastrointestinal tract. In this respect, the gastrointestinal tract is not considered to include the oral cavity.

The route of administration in the present context is considered to be as follows. First, the carrier system is at least partly or fully released in the oral cavity, whereupon saliva generated accomplishes that the carrier system containing a substantial amount of the cannabinoids are swallowed for delivery in the gastrointestinal tract. Without being bound by theory it is believed that the relatively more responsive or quicker release of the carrier system containing the cannabinoid in the oral cavity and the relatively prolonged release of cannabinoids from the carrier in the oral cavity contributes to the cannabinoids being delivered more accurately in the gastrointestinal tract. Accordingly, the system of the present invention provides a synergy with respect to various advantages for delivery of cannabinoids in the gastrointestinal tract.

Accordingly, the synergy between the presence of SEDDS or at least a self-emulsifying agent and cannabinoids was a surprise to the inventors. Particularly, the potential of SEDDS to have a high load of active ingredients, such as in the carrier system according to the invention, further contributes to the synergy of the solid dosage form according to the invention.

In the present context, SEDDS is a solid or liquid dosage form comprising at least a surfactant and optionally a co-surfactant, characterized primarily in that said dosage form can form oil-in-water emulsion spontaneously in the oral cavity or at ambient temperature (referring generally to body temperature, namely 37° C.). When a SEDDS enters the gastrointestinal tract, it is initially self-emulsified as emulsion droplets and rapidly dispersed. The resulting microparticulate of micrometer or nanometer level can penetrate into the mucous membrane of the gastrointestinal tract, and the absorbed oil droplets enter the blood circulation, thereby significantly improving the bioavailability of the active ingredient.

The term "non-DC sugar alcohol particles" refers to particles of non-directly compressible (non-DC) sugar alcohol. It is noted that the terms "non-DC sugar alcohol particles" and "non-DC particles" are used interchangeably. In the present context, the non-DC sugar alcohol particles refer to particles which have not been preprocessed by granulation with e.g. other sugar alcohols or binders for the purpose of obtaining so-called direct compressible particles (DC). In the present context, non-DC sugar alcohol particles include particles obtained by crystallization followed by milling which does not involve other sugar alcohols or binders. Thus, non-DC sugar alcohol particles are considered as particles consisting of non-DC sugar alcohol.

The term "DC sugar alcohol particles" refers to particles of direct compressible (DC) sugar alcohol. It is noted that the terms "DC sugar alcohol particles" and "DC particles" are used interchangeably. DC sugar alcohol particles may be obtained e.g. as particles of sugar alcohols having DC grade by nature, e.g. sorbitol, or by granulating non-DC sugar alcohol with e.g. other sugar alcohols or binders for the purpose of obtaining so-called direct compressible particles (DC). Also, granulation of non-DC sugar alcohol with water as binder is considered to result in "DC sugar alcohol particles" in the present context.

The term "tableted" or "tablet" or "compressed" is intended to mean that the tablet composition is pressed in a tableting apparatus and mainly being composed of particulate matter. Although the terms imply a method step, in the present context, the terms are intended to mean the resulting tablet obtained in tableting a portion of particles. It is noted that a tablet or tableted composition that is mentioned to comprise particles eventually is to be understood as particles that have been pressed together in a tableting step.

The following description outlines explanations of how the tablet of the invention may be produced and further details of what may be added to the inventive composition.

Typically, the process of manufacture of the inventive tablet may be performed in a single tablet press, such as a rotary tablet press. But it may be a benefit under some circumstances to apply a separate tablet press.

Preferably, the upper punch is convex which gives the upper face of the pressed tablet a concave form.

It should of course be noted that the shape of the punches may vary depending of the desired tablet shape.

In some embodiments of the invention, pressing of the tablets are performed at a force of 20 to 50 kN.

In one embodiment of the invention, the "tablet" is a "fast disintegrating tablet" ("FDT"), such as an "orally disintegrating tablet" ("ODT"). In some embodiments, if such a tablet is made as one module, contrary to two or more modules, then the tablet is intended to be an FDT tablet. If on the other hand, the tablet is made of more than one module, such as two modules, such additional module may be a "lozenge" module, which provides a longer disintegration time compared to a FDT module. The combination of an "FDT" module and a "lozenge" module contributes to another embodiment of the invention. A "lozenge" module may also comprise elements from the "FDT" modules but is generally different in composition, providing an extended disintegration time.

The term "lozenge" is intended to cover that a "lozenge composition" has been "compressed" into a "lozenge module". In the present context, a "lozenge module" or similar wording is intended to mean that the module during use in the oral cavity is intended to be sucked or licked on. The term "lozenge" is given the ordinary meaning in the art of lozenges. The intention is that the lozenge module may not be chewed. The intention is also that the FDT module may not be chewed. Generally, the "lozenge module" of the present invention may disintegrate upon sucking or licked in minutes, contrary to seconds for orally disintegrating tablets (ODT) or fast disintegrating tablets (FDT) tablets. Hence, the intention is that the "lozenge module" is to deliver the one or more cannabinoids over a longer period of time than the FDT module, if the tablet is made as a combination of the two modules.

The term "module" is generally intended to be composed of a composition of matter with substantially the same characteristics throughout the module. Hence, if two module are present, then the two modules are different in composition and generally have two different characteristics throughout each module. In the present context, if two modules are present, then the tablet is composed of two modules fused together. The term "fused" is intended to mean that the tablet is gathered together by means of compression force. The tablet may be composed of more than two module. One module may in certain embodiments be a gum base module. In the present context, the invention provides an attractive bi-phasic delivery of masking, even if the delivery of cannabinoids is "single-phased".

In context of the present invention, a "chewable tablet" is intended to mean an oral tablet that is chewed upon oral administration, having characteristics allowing convenient chewing without adverse side effects associated with the texture of the oral tablet.

Particularly, less attention is given on the benefits of chewable tablet formulations that may help in obtaining a release characteristic of cannabinoids that offers increased convenience and effectiveness. One of these release characteristics is increased generation of saliva upon chewing. Increased saliva generation and particularly an experience of increased saliva generation upon administration may have some pronounced benefits for delivery of cannabinoids to mucosal surfaces.

One advantage of a chewable tablet with a content of non-DC sugar alcohol particles is a surprisingly strong saliva generation compared to conventional chewable tablets and lozenges. Particularly, the non-DC particles may surprisingly induce a remarkable generation of saliva. Increased generation of saliva may have a surprisingly high impact on the administration of the carrier systems for mucosal delivery of cannabinoids in the gastrointestinal tract. Specifically, increased generation of saliva may allow an increased release of the carrier systems from the oral formulation, whereupon the carrier systems may be more quickly and more easily swallowed. More specifically, this allows the carrier systems to access the gastrointestinal tract with a higher load of cannabinoids and thereby provide a higher uptake of the one or more cannabinoids to mucosal surfaces in the gastrointestinal tract. Hence, a synergy between uptake of cannabinoids in the gastrointestinal tract and increased saliva generation may be seen according to the invention.

Having a combination of non-DC particles and DC particles may further facilitate sufficient mechanical strength combined with stability of the tablet, disintegrability of the tablet upon chewing, and induced saliva generation upon chewing.

One unexpected advantage over the prior art is that the saliva generation is surprisingly sustained even after a user has swallowed the bulk-portion of the non-DC sugar alcohols. This sustaining of the salivation generation may be advantageous in relation to many applications of an oral tablet ranging from mouthfeel, taste, flavor perception, etc.

In the present context, the non-DC sugar alcohol particles are understood and defined by the skilled person with reference to their typical commercial trade grade.

In an embodiment of the invention, the non-DC sugar alcohol particles have not been granulated prior to tableting. Thus, the non-DC sugar alcohol particles are provided as non-granulated particles. These are typically available in a non-DC form of the relevant sugar alcohol as particles which have not been preprocessed by granulation with other sugar alcohols or binders for the purpose of obtaining so-called direct compressible particles (DC) on the basis of sugar alcohol particles which are by themselves not suitable for direct compression. Such non-DC particles of sugar alcohol may typically consist of the sugar alcohol. Therefore, non-DC sugar alcohol particles may typically be particles consisting of sugar alcohol, which is non-directly compressible in its pure form.

The weight ratio between non-DC sugar alcohol particles and DC sugar alcohol particles have proven significant according to an embodiment of the invention in the sense that a relatively high amount of non-DC sugar alcohol particles must be present in order to obtain the mouthfeel and taste obtained through the invention. However, this taste and mouthfeel also resides in the DC sugar alcohol particles. An example of such DC sugar alcohol particle is DC grade xylitol, which, together with the non-DC sugar alcohol particles may provide a mouthfeel which is unique and very attractive to test panels.

The weight ratio between non-DC sugar alcohol particles and DC sugar alcohol particles is important for the purpose of obtaining an advantageous taste and mouthfeel. By having an upper limit of this weight ratio, the chewer will moreover also experience a desirable crunch sensation when masticating the tablet, the crunch being obtained through the use of substantial amounts of DC sugar alcohol particles and the non-DC sugar alcohol particles.

In an embodiment of the invention, the non-DC sugar alcohol particles are selected from non-DC particles of erythritol, maltitol, xylitol, isomalt, lactitol, mannitol, and combinations thereof. One advantage of the above embodiment may be that a desirable induced saliva generation is obtained. According to an embodiment of the invention, the non-DC sugar alcohol particles consist of sugar alcohols selected from erythritol, maltitol, xylitol, isomalt, lactitol, mannitol, and combinations thereof.

In an embodiment of the invention, the non-DC sugar alcohol particles are selected from non-DC particles of erythritol, maltitol, xylitol, isomalt, and combinations thereof. One advantage of the above embodiment may be that a desirable induced saliva generation is obtained.

In an embodiment of the invention, the non-DC sugar alcohol particles are selected from non-DC particles of erythritol, maltitol, xylitol, and combinations thereof. In an embodiment of the invention, the non-DC sugar alcohol particles are non-DC erythritol particles. One advantage of the above embodiment may be that a desirable induced saliva generation is obtained, together with a cooling sensation. In an embodiment of the invention, the non-DC sugar alcohol particles are non-DC xylitol particles. One advantage of the above embodiment may be that a desirable induced saliva generation is obtained, together with a cooling sensation.

In an embodiment of the invention, said DC sugar alcohol particles comprises sugar alcohols selected from DC particles of sorbitol, erythritol, xylitol, lactitol, maltitol, mannitol, isomalt, and combinations thereof.

Sorbitol is an example of a sugar alcohol, which is considered DC grade, when provided as particles consisting of sorbitol, i.e. in its pure form. On the other hand, several other sugar alcohols are considered non-DC grade if providing them as particles consisting of the specific sugar alcohol. Therefore, such non-DC sugar alcohols are conventionally processed into DC grade sugar alcohols, e.g. by granulating them with e.g. a binder.

Examples of trade grades of DC sugar alcohols include sorbitol particles provided as e.g. Neosorb® P 300 SD from Roquette, mannitol particles provided as e.g. Pearlitol® 300DC or Pearlitol 200 SD from Roquette, maltitol provided as e.g. SweetPearl® P 300 DC, xylitol provided as e.g. Xylisorb® XTAB 400 DC or Xylitab 200 from Dupont.

In an embodiment of the invention, the oral tablet comprises at least two modules. The module may typically be gathered from a plurality of compressed particles and have a weight which is greater than 0.1 gram and less than 10 grams. In an embodiment of the invention, a module is defined as a plurality of particles being compressed together to form a gathered module of particles.

In an embodiment of the invention, the oral tablet comprises a plurality of oral tablet modules. In the present context the application of e.g. two modules are in particular advantageous when non-DC sugar alcohol particles are present primarily in one module thereby optimizing the desired salivation and sensory experience from the module and the tablet as such, whereas another module may primarily comprise DC sugar alcohol particles that serve as a support ensuring that the desired stability and friability of the complete tablet is obtained.

The term "cannabinoid composition" is intended to mean a volume of matter comprising one or more cannabinoids. The cannabinoid composition may contain other components than cannabinoids. The cannabinoid composition may constitute cannabinoids. The cannabinoid composition may constitute one type of cannabinoids. The cannabinoid composition may constitute two types of cannabinoids. The cannabinoid composition may constitute two or more types of cannabinoids.

By the terms "water-insoluble gum base" or "gum base" or "gum base matrix" or similar wording is meant the mainly water-insoluble ingredients and hydrophobic gum base ingredients. The "gum base" may contain gum base polymers, natural resins, elastomer plasticizers, waxes, emulsifiers, fats and/or fillers.

The term "natural resin", as used herein, means resinous compounds being either polyterpene derived from terpenes of natural origin or resinous compounds derived from gum rosin, wood rosin or tall-oil rosin.

Elastomers provide the rubbery, elastomeric and bouncing nature to the gum, which varies depending on this ingredient's chemical structure and how it may be compounded with other ingredients. Elastomers suitable for use in the gum base and gum of the present invention may include natural or synthetic types. Polyvinyl acetate elastomer plasticizers are not considered elastomers according to the invention.

Elastomers may be selected from the group consisting of styrene-butadiene copolymers, polyisobutylene, isobutylene-isoprene copolymers, polyethylene, polyurethane or any combination thereof. Preferred elastomers are styrene-butadiene copolymers (SBR), polyisobutylene and isobutylene-isoprene copolymers (BR).

Styrene-butadiene type elastomers, or SBR as they may be called, typically are copolymers of from about 20:80 to 60:40 styrenes:butadiene monomers. The ratio of these monomers affects the elasticity of the SBR as evaluated by mooney viscosity. As the styrene:butadiene ratio decreases, the mooney viscosity decreases.

The structure of SBR typically consists of straight chain 1,3-butadiene copolymerized with phenylethylene (styrene). The average molecular weight of SBR is <600,000 g/mole.

Isobutylene-isoprene type elastomers, or butyl as they may be called, have molar percent levels of isoprene ranging from 0.2 to 4.0. Similar to SBR, as the isoprene:isobutylene ratio decreases, so does the elasticity, measured by mooney viscosity.

The structure of butyl rubber typically consists of branched 2-methyl-1,3-butadiene (isoprene) copolymerized with branched 2-methylpropene (isobutylene). The average molecular weight of BR is in the range from 150,000 g/mole to 1,000,000 g/mole.

Polyisobutylene, or PIB as they may be called, type elastomers are polymers of 2-methylpropene. The low molecular weight elastomers provide soft chew characteristics to the gum base and still provide the elastic qualities as do the other elastomers. Average molecular weights may range from about 30,000 to 120,000 g/mole and the penetration may range from about 4 millimeters to 20 millimeters. The higher the penetration, the softer the PIB. Similar to the SBR and butyl, the high molecular weight elastomers provide elasticity to the gum. Average molecular weight may range from 120,000 to 1,000,000 g/mole.

Polybutene range in average molecular weight from about 5.000 g/mole to about 30.000 g/mole.

Useful natural elastomers include natural rubber such as smoked or liquid latex and guayule, natural gums such as jelutong, lechi caspi, perillo, sorva, massaranduba balata, massaranduba chocolate, nispero, rosidinha, chicle, gutta percha, gutta kataiu, niger gutta, tunu, chilte, chiquibul, gutta hang kang. Natural elastomers may also be applied in aspects of the present invention.

Elastomer plasticizers vary the firmness of the gum base. Their specificity on elastomer inter-molecular chain breaking (plasticizing) along with their varying softening points cause varying degrees of finished gum firmness and compatibility when used in base. Polyvinyl acetate elastomers plasticizers are examples of elastomer plasticizers of the present invention.

Natural resins may be selected from ester gums including as examples glycerol esters of partially hydrogenated rosins, glycerol esters of polymerized rosins, glycerol esters of partially dimerized rosins, glycerol esters of tally oil rosins, pentaerythritol esters of partially hydrogenated rosins, methyl esters of rosins, partially hydrogenated methyl esters of rosins, pentaerythritol esters of rosins, synthetic resins such as terpene resins derived from alpha-pinene, beta-pinene, and/or d-limonene, and natural terpene resins.

In an embodiment of the invention, the solid dosage form comprises further ingredients selected from the group consisting of flavors, dry-binders, tableting aids, anti-caking agents, emulsifiers, antioxidants, enhancers, mucoadhesives, absorption enhancers, high intensity sweeteners, softeners, colors, active ingredients, water-soluble indigestible polysaccharides, water-insoluble polysaccharides or any combination thereof.

The solid dosage form according to the invention is manufactured by applying pressure to a content of particles by suitable compression means. The particles or powder is then pressed into a compact coherent tablet. The particles may for example comprise so-called primary particles or aggregated primary particles. When these are pressed, bonds are established between the particles or granules, thereby conferring a certain mechanical strength to the pressed tablet.

It should be noted that the above-introduced terms: powder, primary particles and aggregated primary particles may be somewhat misleading in the sense that the difference between primary particles and aggregated primary particles may very often be looked upon differently depending on the background of the user. Some may for instance regard a sweetener, such as sorbitol, as a primary particle in spite of the fact that sorbitol due to the typically preprocessing performed on sorbitol when delivered to the customer should rather be regarded as some sort of aggregated primary particles. The definition adopted in the description of this invention is that aggregated primary particles refer to macro-particles comprising more or less preprocessed primary particles.

When pressure is applied to the particles, the bulk volume is reduced, and the amount of air is decreased. During this process energy is consumed. As the particles come into closer proximity to each other during the volume reduction process, bonds may be established between the particles or granules. The formation of bonds is associated with a reduction in the energy of the system as energy is released. Volume reduction takes place by various mechanisms and different types of bonds may be established between the particles or granules depending on the pressure applied and the properties of the particles or granules. The first thing that happens when a powder is pressed is that the particles are rearranged under low compaction pressures to form a closer packing structure. Particles with a regular shape appear to undergo rearrangement more easily than those of irregular shape. As the pressure increases, further rearrangement is prevented, and subsequent volume reduction is obtained by plastic and elastic deformation and/or fragmentation of the tablet particles. Brittle particles are likely to undergo fragmentation, i.e. breakage of the original particles into smaller units. Plastic deformation is an irreversible process resulting in a permanent change of particle shape, whereas the particles resume their original shape after elastic deformation. Evidently, both plastic and elastic deformation may occur, when compressing an solid dosage form.

Several studies of the bond types in pressed tablets have been made over the years, typically in the context of pharmaceuticals and several techniques of obtaining pressed tablets on the basis of available powders has been provided. Such studies have been quite focused on what happens when the volume reduction is performed and how the end-product may be optimized for the given purpose. Several refinements with respect to pressed tablets has for instance been made in the addition of for example binders in the tablet raw materials for the purpose of obtaining a sufficient strength to the final pressed tablet while maintaining acceptable properties, e.g. with respect to release.

Contrary to tableted chewing gum, conventional chewing gum may be manufactured by sequentially adding the various chewing gum ingredients to a commercially available mixer known in the art where the finished gum base is already present. After the initial ingredients have been thoroughly mixed, the gum mass is discharged from the mixer and shaped into the desired form such as by rolling into sheets and cutting into sticks, extruded into chunks or casting into pellets. Generally, the ingredients of conventional chewing gum may be mixed by first melting the gum base and adding it to the running mixer. Colors, active agents and/or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added. The entire mixing procedure typically takes from thirty to forty minutes, but longer mixing times may sometimes be required. Those skilled in the art will recognize that many variations of the above described procedure may be followed.

In some embodiments of the invention, the solid dosage form does not include conventional chewing gum, i.e., so-called extruded chewing gum.

In accordance with the invention, the tableted solid dosage form according to the invention may comprise about 0.1 to about 75% by weight of an outer coating applied onto the solid dosage form centre. Thus, suitable coating types include hard coatings, film coatings and soft coatings of any composition including those currently used in coating of tableted solid dosage form.

One presently preferred outer coating type is a hard coating, which term is used in the conventional meaning of that term including sugar coatings and sugar-free (or sugarless) coatings and combinations thereof. The object of hard coating is to obtain a sweet, crunchy layer, which is appreciated by the consumer and it may moreover protect the solid dosage form centres for various reasons. In a typical process of providing the solid dosage form centres with a protective sugar coating, the solid dosage form centres are successively treated in suitable coating equipment with aqueous solutions of crystallisable sugar such as sucrose or dextrose, which, depending on the stage of coating reached, may contain other functional ingredients, e.g. fillers, binding agents, colours, etc. In the present context, the sugar coating may contain further functional or active compounds including flavour compounds and/or active compounds.

In a typical hard coating process as it will be described in detail in the following, a suspension containing crystallisable sugar and/or polyol is applied onto the solid dosage form centres and the water it contains is evaporated off by blowing with air. This cycle must be repeated several times, typically 3 to 80 times, in order to reach the swelling required. The term "swelling" refers to the increase in weight or thickness of the products, as considered at the end of the coating operation by comparison with the beginning, and in relation to the final weight or thickness of the coated products. In accordance with the present invention, the coating layer constitutes about 0.1 to about 75% by weight of the finished solid dosage form element, such as about 10 to about 60% by weight, including about 15 to about 50% by weight.

In an embodiment of the invention, the product is a pouch.

In one aspect of the invention, the population of particles used for tableting may also be present in a pouch as a powder. Hence, this aspect of the invention includes the population of particles in a pouch without tableting, but as a powder or part of a powder with other powders or powder ingredients. It follows that the directly compressible (DC) and non-directly compressible (non-DC) sugar alcohol particles of the invention may be included in the pouch according to the invention. Additional embodiments pertaining to the population of particles of the invention will also be applicable when included in a pouch. It is noted that additional ingredients may be present in the pouch, such as water-soluble fibers or water-insoluble fibers, including microcrystalline cellulose.

According to an advantageous embodiment of the invention the pouch comprises a water-permeable membrane, such as a woven or non-woven fabric.

The pouches according to the invention comprise openings, where the characteristic opening dimension is adapted to a characteristic dimension of the population of particles so as to retain the matrix composition inside the pouch before use and/or to retain a part of the content inside the pouch during use.

In other words, according to the various embodiments, the pouch forms a membrane allowing passage of saliva and prevents or inhibits passage of at least a part of the content. The membrane of the pouch may be of any suitable material e.g. woven or non-woven fabric (e.g. cotton, fleece etc.), heat sealable non-woven cellulose or other polymeric materials such as a synthetic, semi-synthetic or natural polymeric material. An example of suitable pouch material is paper made of pulp and a small amount of wet strength agent. A material suitable for use must provide a semi-permeable membrane layer to prevent the powder or composition from leaving the bag or pouch during use. Suitable materials are also those that do not have a significant impact on the release of the active ingredients from the pouch.

The powder is filled into pouches and is maintained in the pouch by a sealing. An ideal pouch is chemically and physically stable, it is pharmaceutically acceptable, it is insoluble in water, it is easy to fill with powder and seal, and it provides a semi-permeable membrane layer which prevent the powder from leaving the bag but permit saliva and therein dissolved or sufficiently small-sized suspended components from the powder in the pouch to pass through said pouch.

The pouch may be placed in the oral cavity by the user. Saliva then enters into the pouch, and the active ingredient and other components, which are soluble in saliva, start to dissolve and are transported with the saliva out of the pouch into the oral cavity. In some embodiments of the invention, the pouch may be masticated in a similar way as chewing a gum. This is particularly advantageous when the population of particles comprise gum base. Hence, the pouch may be masticated into a coherent residual containing water-insoluble components.

According to embodiments of the invention, flavors may be selected from the group consisting of coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

Antioxidants suitable for use include butylated hydroxyanisole (BHA), butylated hydroxytoluene (BHT), betacarotenes, tocopherols, acidulants such as Vitamin C (ascorbic acid or corresponding salts (ascorbates)), propyl gallate, catechins, green tea extract other synthetic and natural types or mixtures thereof.

High intensity sweetening agents can also be used according to preferred embodiments of the invention. Preferred high intensity sweeteners include, but are not limited to sucralose, aspartame, salts of acesulfame, alitame, neotame, saccharin and its salts, cyclamic acid and its salts, glycyrrhizin, dihydrochalcones, thaumatin, monellin, monk fruit extract, advantame, stevioside and the like, alone or in combination.

In order to provide longer lasting sweetness and flavor perception, it may be desirable to encapsulate or otherwise control the release of at least a portion of the high intensity sweeteners.

Techniques such as wet granulation, wax granulation, spray drying, spray chilling, fluid bed coating, conservation, encapsulation in yeast cells and fiber extrusion may be used to achieve desired release characteristics. Encapsulation of sweetening agents can also be provided using another formulation component such as a resinous compound.

Usage level of the high-intensity sweetener will vary considerably and will depend on factors such as potency of the sweetener, rate of release, desired sweetness of the product, level and type of flavor used and cost considerations. Thus, the active level of artificial sweetener may vary from about 0.001 to about 8% by weight (preferably from about 0.02 to about 8% by weight). When carriers used for encapsulation are included, the usage level of the encapsulated high-intensity sweetener will be proportionately higher.

The invention, if desired, may include one or more fillers/texturizers including as examples, magnesium- and calcium carbonate, sodium sulphate, ground limestone, silicate compounds such as magnesium- and aluminum silicate, kaolin and clay, aluminum oxide, silicium oxide, talc, titanium oxide, mono-, di- and tri-calcium phosphates, cellulose polymers, such as wood, and combinations thereof. According to an embodiment of the invention, one preferred filler/texturizer is calcium carbonate.

According to the invention, the one or more cannabinoids may be selected from various cannabinoids.

"Cannabinoids" are a group of compounds including the endocannabinoids, the phytocannabinoids and those which are neither endocannabinoids or phytocannabinoids, hereinafter "syntho-cannabinoids".

"Endocannabinoids" are endogenous cannabinoids, which may have high affinity ligands of CB1 and CB2 receptors.

"Phytocannabinoids" are cannabinoids that originate in nature and can be found in the cannabis plant. The phytocannabinoids can be present in an extract including a botanical drug substance, isolated, or reproduced synthetically.

"Syntho-cannabinoids" are those compounds capable of interacting with the cannabinoid receptors (CB1 and/or CB2) but are not found endogenously or in the cannabis plant. Examples include WIN 55212 and rimonabant.

An "isolated phytocannabinoid" or "isolated cannabinoid" is one which has been extracted from the cannabis plant and purified to such an extent that the additional components such as secondary and minor cannabinoids and the non-cannabinoid fraction have been substantially removed.

A "synthetic cannabinoid" is one which has been produced by chemical synthesis. This term includes modifying an isolated phytocannabinoid, by, for example, forming a pharmaceutically acceptable salt thereof.

A "substantially pure" cannabinoid is defined as a cannabinoid which is present at greater than 95% (w/w) pure. More preferably greater than 96% (w/w) through 97% (w/w) thorough 98% (w/w) to 99% % (w/w) and greater.

In some embodiments, a purity of above 80% (w/w) may be applied.

A "highly purified" cannabinoid is defined as a cannabinoid that has been extracted from the cannabis plant and purified to the extent that other cannabinoids and non-cannabinoid components that are co-extracted with the cannabinoids have been substantially removed, such that the highly purified cannabinoid is greater than or equal to 95% (w/w) pure.

"Plant material" is defined as a plant or plant part (e.g. bark, wood, leaves, stems, roots, flowers, fruits, seeds, berries or parts thereof) as well as exudates, and includes material falling within the definition of "botanical raw material" in the Guidance for Industry Botanical Drug Products Draft Guidance, August 2000, US Department of Health and Human Services, Food and Drug Administration Center for Drug Evaluation and Research.

In the context of this application the terms "cannabinoid extract" or "extract of cannabinoids", which are used interchangeably, encompass "Botanical Drug Substances" derived from cannabis plant material. A Botanical Drug Substance is defined in the Guidance for Industry Botanical Drug Products Draft Guidance, August 2000, US Department of Health and Human Services, Food and Drug Administration Centre for Drug Evaluation and Research as: "A drug substance derived from one or more plants, algae, or macroscopic fungi. It is prepared from botanical raw materials by one or more of the following processes: pulverisation, decoction, expression, aqueous extraction, ethanolic extraction, or other similar processes." A botanical drug substance does not include a highly purified or chemically modified substance derived from natural sources. Thus, in the case of cannabis, "botanical drug substances" derived from cannabis plants do not include highly purified, Pharmacopoeial grade cannabinoids.

The term "Cannabis plant(s)" encompasses wild type *Cannabis sativa* and also variants thereof, including cannabis chemovars which naturally contain different amounts of the individual cannabinoids, *Cannabis sativa* subspecies *indica* including the variants var. *indica* and var. *kafiristanica*, *Cannabis indica*, *Cannabis ruderalis* and also plants which are the result of genetic crosses, self-crosses or hybrids thereof. The term "Cannabis plant material" is to be interpreted accordingly as encompassing plant material derived from one or more cannabis plants. For the avoidance of doubt it is hereby stated that "cannabis plant material" includes dried cannabis biomass.

Preferably the one or more cannabinoids are selected from: cannabichromene (CBC), cannabichromenic acid (CBCV), cannabidiol (CBD), cannabidiolic acid (CBDA), cannabidivarin (CBDV), cannabigerol (CBG), cannabigerol propyl variant (CBGV), cannabicyclol (CBL), cannabinol (CBN), cannabinol propyl variant (CBNV), cannabitriol (CBO), tetrahydrocannabinol (THC), tetrahydrocannabinolic acid (THCA), tetrahydrocannabivarin (THCV) and tetrahydrocannabivarinic acid (THCV A). More preferably the one or more cannabinoid is CBD or THC. This list is not exhaustive and merely details the cannabinoids which are identified in the present application for reference.

So far, more than 120 different phytocannabinoids have been identified which are within the scope of the present invention.

Cannabinoids can be split into different groups as follows: Phytocannabinoids; Endocannabinoids; and Synthetic cannabinoids.

Cannabinoid receptors can be activated by three major groups of agonist ligands, for the purposes of the present invention and whether or not explicitly denominated as such herein, lipophilic in nature and classed respectively as: endocannabinoids (produced endogenously by mammalian cells); phytocannabinoids (such as cannabidiol, produced by the cannabis plant); and, synthetic cannabinoids (such as HU-210).

Phytocannabinoids can be found as either the neutral carboxylic acid form or the decarboxylated form depending on the method used to extract the cannabinoids. For example, it is known that heating the carboxylic acid form will cause most of the carboxylic acid form to decarboxylate.

Phytocannabinoids can also occur as either the pentyl (5 carbon atoms) or propyl (3 carbon atoms) variant. For example, the phytocannabinoid THC is known to be a CB1 receptor agonist whereas the propyl variant THCV has been discovered to be a CB1 receptor antagonist meaning that it has almost opposite effects.

According to the invention, examples of phytocannabinoids may be cannabichromene (CBC), cannabichromenic acid (CBCV), cannabidiol (CBD), cannabidiolic acid (CBDA), cannabidivarin (CBDV), cannabigerol (CBG), cannabigerol propyl variant (CBGV), cannabicyclol (CBL), cannabinol (CBN), cannabinol propyl variant (CBNV), cannabitriol (CBO), tetrahydrocannabinol (THC), tetrahydrocannabinolic acid (THCA), tetrahydrocannabivarin (THCV) and tetrahydrocannabivarinic acid (THCV A). More preferably the one or more cannabinoid is CBD or THC.

The formulation according to the present invention may also comprise at least one cannabinoid selected from those disclosed in A. Douglas Kinghorn et al., Phytocannabinoids, Vol. 103, Chapter 1, pages 1-30.

Examples of endocannabinoids are molecules that activate the cannabinoid receptors within the body. Examples include 2-arachidonyl glycerol (2AG), 2-arachidonyl glyceryl ether (2AGE), arachidonyl dopamine, and arachidonyl ethanolamide (anandamide). Structurally related endogenous molecules have been identified that share similar structural features, but that display weak or no activity towards the cannabinoid receptors but are also termed endocannabinoids. Examples of these endocannabinoid lipids include 2-acyl glycerols, alkyl or alkenyl glyceryl ethers, acyl dopamines and N-acylethanolamides that contain alternative fatty acid or alcohol moieties, as well as other fatty acid amides containing different head groups. These include N-acylserines as well as many other N-acylated amino acids. Examples of cannabinoid receptor agonists are neuromodulatory and affect short-term memory, appetite, stress response, anxiety, immune function and analgesia.

In one embodiment the cannabinoid is palmitoylethanolamide (PEA) which is an endogenous fatty acid amide belonging to the class of nuclear factor agonists.

Synthetic cannabinoids encompass a variety of distinct chemical classes: the cannabinoids structurally related to THC, the cannabinoids not related to THC, such as (cannabimimetics) including the aminoalkylindoles, 1,5-diarylpyrazoles, quinolines, and arylsulfonamides, and eicosanoids related to the endocannabinoids. All or any of these cannabinoids can be used in the present invention.

It is preferred that the formulation comprises one or two primary cannabinoids, which are preferably selected from the group consisting of, cannabidiol (CBD) or cannabidivarin (CBDV), tetrahydrocannabinol (THC), tetrahydrocannabivarin (THCV), tetrahydrocannabinolic acid (THCA), cannabigerol (CBG) and cannabidiolic acid (CBDA) or a combination thereof. It is preferred that the formulation comprises cannabidiol and/or tetrahydrocannabinol.

Preferably, the solid dosage form of the present invention may be used for the treatment or alleviation of pain, epilepsy, cancer, nausea, inflammation, congenital disorders, neurological disorders, oral infections, dental pain, sleep apnea, psychiatric disorders, gastrointestinal disorders, inflammatory bowel disease, appetite loss, diabetes and fibromyalgia.

In a further aspect of the present invention, the oral cannabinoid formulation is suitable for use in the treatment of conditions requiring the administration of a neuroprotectant or anti-convulsive medication.

The oral cannabinoid formulation may be for use in the treatment of seizures.

The oral cannabinoid formulation may be for use in the treatment of Dravet syndrome, Lennox Gastaut syndrome, myoclonic seizures, juvenile myoclonic epilepsy, refractory epilepsy, schizophrenia, juvenile spasms, West syndrome, infantile spasms, refractory infantile spasms, tuberous sclerosis complex, brain tumours, neuropathic pain, cannabis use disorder, post-traumatic stress disorder, anxiety, early psychosis, Alzheimer's disease, and autism.

The following non-limiting examples illustrate different variations of the present invention. The examples are meant for indicating the inventive concept; hence the mentioned examples should not be understood as exhaustive for the present. In particular, CBD is used as an exemplary compound, but may also be another cannabinoid.

EXAMPLES

Example 1

Premix: Hydrogenated Vegetable Oil (HVO) Added to a Mixture of Isolated CBD and Mesoporous Carriers A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was sieved through a 600 microns sieve and added to the silica carrier composition. This mixture was mixed in the mixer at a speed of about 80 rpm for about 5 minutes. After activation of the chopper (about 600 rpm) of the Lödige mixer, HVO provided from AAK under the tradename Akocrem NT 76-33 with a melting temperature of 30-35 Degree Celsius was melted at a temperature of about 55 Degree Celsius and added to the mixture in an amount of about 500 g. After adding the lipid composition, the temperature in the mixer was about 49 Degree Celsius, and the mixture was further mixed for about 10 minutes. After 10 minutes, the temperature of the final mixture was about 51 Degree Celsius. A total of 2 kg mixture powder premix was made in which the CBD content was about 250 mg/g.

For all examples [%] denotes "% by weight", also referred to as "wt %", unless specifically stated otherwise.

TABLE 1

Hydrogenated Vegetable Oil (HVO) having been preheated to a temperature of about 55 Degree Celsius. Variation in the content of CBD isolate (purity 99%). Sample 103 corresponds to the procedure above, the other samples are adjusted to the variation in contents.

| Raw material name | Premix Number | | | | | | |
|---|---|---|---|---|---|---|---|
| | 100 Content [%] | 101 Content [%] | 102 Content [%] | 103 Content [%] | 104 Content [%] | 105 Content [%] | 106 Content [%] |
| Syloid XDP 3050 | 20.0 | 30.0 | 40.0 | 50.0 | 60.0 | 70.0 | 80.0 |
| CBD isolate (purity 99%) | 40.0 | 35.0 | 30.0 | 25.0 | 20.0 | 15.0 | 10.0 |
| HVO | 40.0 | 35.0 | 30.0 | 25.0 | 20.0 | 15.0 | 10.0 |
| Total | 100 | 100 | 100 | 100 | 100 | 100 | 100 |

TABLE 2

Hydrogenated Vegetable Oil (HVO) having been preheated to a temperature of about 55 Degree Celsius. Variation in the content of HVO.

| Raw material name | Premix Number | | | | |
|---|---|---|---|---|---|
| | 110 Content [%] | 111 Content [%] | 112 Content [%] | 113 Content [%] | 114 Content [%] |
| Syloid XDP 3050 | 50.0 | 50.0 | 50.0 | 50.0 | 50.0 |
| CBD isolate (purity 99%) | 45.0 | 40.0 | 20.0 | 10.0 | 5.0 |
| HVO | 5.0 | 10.0 | 30.0 | 40.0 | 45.0 |
| Total | 100 | 100 | 100 | 100 | 100 |

The samples are prepared according to the procedure above but adjusted to the variation in contents.

TABLE 3

Hydrogenated Vegetable Oil (HVO) having been preheated to a temperature of about 55 Degree Celsius. Variation in the type of carrier. Here Syloid XDP 3050 was replaced by other carriers.

| Raw material name | Premix Number | | | | |
|---|---|---|---|---|---|
| | 120 Content [%] | 121 Content [%] | 122 Content [%] | 123 Content [%] | 124 Content [%] |
| Syloid XDP 3150 (from Grace) | | | 50.0 | | |
| Aeroperl 300 (from Evonik) | 50.0 | | | | |
| Prosolv 730 (from JRS Pharma) | | | | 50.0 | |
| Omyanutra (from Omya) | | 50.0 | | | |
| VivaPur 105 (from JRS Pharma) | | | | | 50.0 |
| CBD isolate (purity 99%) | 25.0 | 25.0 | 25.0 | 25.0 | 25.0 |
| HVO | 25.0 | 25.0 | 25.0 | 25.0 | 25.0 |
| Total | 100 | 100 | 100 | 100 | 100 |

The samples are prepared according to the procedure above but adjusted to the variation in contents.

Example 2

Premix: Miglyol Added to a Mixture of Isolated CBD and Mesoporous Carriers

A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was sieved through a 600 microns sieve and added to the silica carrier composition. This mixture was mixed in the mixer at a speed of about 80 rpm for about 5 minutes. After activation of the chopper (about 600 rpm) of the Lödige mixer, Medium Chain Triglyceride (MCT), Miglyol 812, provided from Sasol was added to the mixture during a period of about 3 minutes in an amount of about 500 g. After adding the Miglyol 812, the mixture was heated and further mixed for about 10 minutes. After 10 minutes, the temperature of the final mixture was about 51 Degree Celsius. A total of 2 kg mixture powder premix was made in which the CBD content was about 250 mg/g.

TABLE 4

Miglyol 812 having not been preheated. Variation in the content of CBD isolate (purity 99%). Sample 203 corresponds to the procedure above, the other samples are adjusted to the variation in contents.

| Raw material name | Premix Number | | | | | | |
|---|---|---|---|---|---|---|---|
| | 200 Content [%] | 201 Content [%] | 202 Content [%] | 203 Content [%] | 204 Content [%] | 205 Content [%] | 206 Content [%] |
| Syloid XDP 3050 | 20.0 | 30.0 | 40.0 | 50.0 | 60.0 | 70.0 | 80.0 |
| CBD isolate (purity 99%) | 40.0 | 35.0 | 30.0 | 25.0 | 20.0 | 15.0 | 10.0 |
| Miglyol 812 | 40.0 | 35.0 | 30.0 | 25.0 | 20.0 | 15.0 | 10.0 |
| Total | 100 | 100 | 100 | 100 | 100 | 100 | 100 |

TABLE 5

Miglyol 812 having not been preheated. Variation in the content of Miglyol 812.

| Raw material name | Premix Number | | | | |
|---|---|---|---|---|---|
| | 210 Content [%] | 211 Content [%] | 212 Content [%] | 213 Content [%] | 214 Content [%] |
| Syloid XDP 3050 | 50.0 | 50.0 | 50.0 | 50.0 | 50.0 |
| CBD isolate (purity 99%) | 45.0 | 40.0 | 20.0 | 10.0 | 5.0 |
| Miglyol 812 | 5.0 | 10.0 | 30.0 | 40.0 | 45.0 |
| Total | 100 | 100 | 100 | 100 | 100 |

The samples are prepared according to the procedure above but adjusted to the variation in contents.

TABLE 6

Miglyol having not been preheated unless specifically denoted. Variation in the type of Miglyol.

| Raw material name | Premix Number | | | | |
|---|---|---|---|---|---|
| | 220 Content [%] | 221 Content [%] | 222 Content [%] | 223 Content [%] | 224 Content [%] |
| Syloid XDP 3050 | 50.0 | 50.0 | 50.0 | 50.0 | 50.0 |
| CBD isolate (purity 99%) | 25.0 | 25.0 | 25.0 | 25.0 | 25.0 |
| Miglyol 812 | | | 25.0 | | |
| Miglyol 810 | 25.0 | | | | |
| Miglyol 818 | | 25.0 | | | |
| Miglyol 829 | | | | 25.0 | |
| Miglyol 840 | | | | | 25.0 |
| Total | 100 | 100 | 100 | 100 | 100 |

Sample 222 corresponds to the procedure above. Miglyol 829 in Powder Premix Number 223 is heated to about 50° C. in order to work.

TABLE 7

Miglyol 812 having not been preheated. Variation in the type of carrier. Here Xyloid XDP 3050 was replaced by other carriers. The samples are prepared according to the procedure above but adjusted to the variation in contents.

| Raw material name | Premix Number | | | | | |
|---|---|---|---|---|---|---|
| | 230 Content [%] | 231 Content [%] | 232 Content [%] | 233 Content [%] | 234 Content [%] | 235 Content [%] |
| Syloid XDP 3150 (from Grace) | | | 50.0 | | | |
| Aeroperl 300 (from Evonik) | 50.0 | | | | | |
| Prosolv 730 (from JRS Pharma) | | | | 50.0 | | |
| Omyanutra (from Omya) | | 50.0 | | | | |
| VivaPur 105 (from JRS Pharma) | | | | | 50.0 | |
| Neusilin ® US2 | | | | | | 50.0 |
| CBD isolate (purity 99%) | 25.0 | 25.0 | 25.0 | 25.0 | 25.0 | 25.0 |
| Miglyol 812 | 25.0 | 25.0 | 25.0 | 25.0 | 25.0 | 25.0 |
| Total | 100 | 100 | 100 | 100 | 100 | 100 |

Example 3

Premix: High Load—Hydrogenated Vegetable Oil (HVO) Added to a Mixture of Isolated CBD and Mesoporous Carriers

A mesoporous silica carrier (Syloid XDP 3050) provided from Grace in an amount of about 1000 g was added to a Lödige high shear mixer and heated to a temperature of about 55 Degree Celsius. Thereafter, a cannabinoid powder composition comprising CBD isolate from cannabis plant tissues (phytocannabinoid) with a 99% content of CBD provided by Medical Hemp (batch number MH B18592) in an amount of about 750 g was sieved through a 600 microns sieve and added to the silica carrier composition. This mixture was mixed in the mixer at a speed of about 80 rpm for about 5 minutes. After activation of the chopper (about 600 rpm) of the Lödige mixer, HVO provided from AAK under the tradename Akocrem NT 76-33 with a melting temperature of 30-35 Degree Celsius was melted at a temperature of about 55 Degree Celsius and added to the mixture in an amount of about 250 g. After adding the lipid composition, the temperature in the mixer was about 49 Degree Celsius, and the mixture was further mixed for about 10 minutes. After 10 minutes, the temperature of the final mixture was about 51 Degree Celsius. A total of 2 kg mixture powder premix was made in which the CBD content was about 375 mg/g.

TABLE 8

Hydrogenated Vegetable Oil (HVO) having been preheated to a temperature of about 55 Degree Celsius. Variation in the content of CBD isolate (purity 99%).

| | Premix Number | | | | |
|---|---|---|---|---|---|
| | 300 | 301 | 302 | 303 | 304 |
| Raw material name | Content [%] | Content [%] | Content [%] | Content [%] | Content [%] |
| Syloid XDP 3050 | 62.5 | 57.5 | 50.0 | 37.5 | 27.5 |
| CBD isolate (purity 99%) | 25.0 | 30.0 | 37.5 | 50.0 | 60.0 |
| HVO | 12.5 | 12.5 | 12.5 | 12.5 | 12.5 |
| Total | 100 | 100 | 100 | 100 | 100 |

Sample 302 corresponds to the procedure above, the other samples are adjusted to the variation in contents.

TABLE 9

Hydrogenated Vegetable Oil (HVO) having been preheated to a temperature of about 55 Degree Celsius. Variation in the content of HVO.

| | Premix Number | | | | |
|---|---|---|---|---|---|
| | 310 | 311 | 312 | 313 | 314 |
| Raw material name | Content [%] | Content [%] | Content [%] | Content [%] | Content [%] |
| Xyloid XDP 3050 | 58.5 | 56.5 | 52.5 | 42.5 | 32.5 |
| CBD isolate (purity 99%) | 37.5 | 37.5 | 37.5 | 37.5 | 37.5 |
| HVO | 4.0 | 6.0 | 10.0 | 20.0 | 30.0 |
| Total | 100 | 100 | 100 | 100 | 100 |

The samples are prepared according to the procedure above but adjusted to the variation in contents.

TABLE 10

Hydrogenated Vegetable Oil (HVO) having been preheated to a temperature of about 55 Degree Celsius. Variation in the type of carrier. Here Syloid XDP 3050 was replaced by other carriers. The samples are prepared according to the procedure above but adjusted to the variation in contents.

| | Premix Number | | | | | |
|---|---|---|---|---|---|---|
| | 320 | 321 | 322 | 323 | 324 | 325 |
| Raw material name | Content [%] | Content [%] | Content [%] | Content [%] | Content [%] | Content [%] |
| Syloid XDP 3150 (from Grace) | | | 50.0 | | | |
| Aeroperl 300 (from Evonik) | 50.0 | | | | | |
| Prosolv 730 (from JRS Pharma) | | | | 50.0 | | |
| Omyanutra (from Omya) | | 50.0 | | | | |
| VivaPur 105 (from JRS Pharma) | | | | | 50.0 | |
| Neusilin ® US2 | | | | | | 50.0 |
| CBD isolate (purity 99%) | 37.5 | 37.5 | 37.5 | 37.5 | 37.5 | 37.5 |
| HVO | 12.5 | 12.5 | 12.5 | 12.5 | 12.5 | 12.5 |
| Total | 100 | 100 | 100 | 100 | 100 | 100 |

Example 4

Premix: Hydrogenated Vegetable Oil (HVO) Mixture with Isolated CBD Added to Mesoporous Carriers A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was mixed with HVO provided from AAK under the tradename Akocrem NT 76-33 with a melting temperature of 30-35 Degree Celsius in an amount of about 500 g. While stirring, the CBD-HVO mixture was heated to a temperature of about 60 Degree Celsius to form a liquid solution of CBD in HVO. The mixture of CBD and HVO was then added to the silica carrier. After adding the lipid composition, the mixture was mixed for about 10 minutes. A total of 2000 g mixture powder premix was made.

TABLE 11

Hydrogenated Vegetable Oil (HVO) having been heated to a temperature of about 60 Degree Celsius after mixing with 99% purity CBD (50% CBD mixture). Sample 403 corresponds to the procedure above, the other samples are adjusted to the variation in contents.

| | Premix Number | | | | | | |
|---|---|---|---|---|---|---|---|
| Raw material name | 400 Content [%] | 401 Content [%] | 402 Content [%] | 403 Content [%] | 404 Content [%] | 405 Content [%] | 406 Content [%] |
| Syloid XDP 3050 | 20.0 | 30.0 | 40.0 | 50.0 | 60.0 | 70.0 | 80.0 |
| CBD isolate (50% CBD mixture) | 80.0 | 70.0 | 60.0 | 50.0 | 40.0 | 30.0 | 20.0 |
| Total | 100.0 | 100 | 100 | 100 | 100 | 100 | 100.0 |

TABLE 12

Hydrogenated Vegetable Oil (HVO) having been heated to a temperature of about 60 Degree Celsius after mixing with 99% purity CBD (X % CBD mixture). Variation in the content of CBD in mixture with HVO.

| | Premix Number | | | | |
|---|---|---|---|---|---|
| Raw material name | 410 Content [%] | 411 Content [%] | 412 Content [%] | 413 Content [%] | 414 Content [%] |
| Syloid XDP 3050 | 50.0 | 50.0 | 50.0 | 50.0 | 50.0 |
| CBD isolate (X % CBD mixture) | 50.0 (10%)* | 50.0 (30%)* | 50.0 (50%)* | 50.0 (80%)* | 50.0 (90%)* |
| Total | 100 | 100 | 100 | 100 | 100 |

*denotes the percentage X of CBD in "X % CBD mixture". Sample 412 corresponds to the procedure above, the other samples are adjusted to the variation in contents.

TABLE 13

Hydrogenated Vegetable Oil (HVO) having been heated to a temperature of about 60 Degree Celsius after mixing with 99% CBD (75% CBD mixture). Variation in the type of carrier. Here Syloid XDP 3050 was replaced by other carriers. The samples are prepared according to the procedure above but adjusted to the variation in contents.

| | Premix Number | | | | | |
|---|---|---|---|---|---|---|
| Raw material name | 420 Content [%] | 421 Content [%] | 422 Content [%] | 423 Content [%] | 424 Content [%] | 425 Content [%] |
| Syloid XDP 3150 (from Grace) | | | 50.0 | | | |
| Aeroperl 300 (from Evonik) | 50.0 | | | | | |
| Prosolv 730 (from JRS Pharma) | | | | | 50.0 | |
| Omyanutra (from Omya) | | 50.0 | | | | |
| VivaPur 105 (from JRS Pharma) | | | | | | 50.0 |

TABLE 13-continued

Hydrogenated Vegetable Oil (HVO) having been heated to a temperature of about 60 Degree Celsius after mixing with 99% CBD (75% CBD mixture). Variation in the type of carrier. Here Syloid XDP 3050 was replaced by other carriers. The samples are prepared according to the procedure above but adjusted to the variation in contents.

| Raw material name | Premix Number | | | | | |
|---|---|---|---|---|---|---|
| | 420 Content [%] | 421 Content [%] | 422 Content [%] | 423 Content [%] | 424 Content [%] | 425 Content [%] |
| Neusilin ® US2 | | | | | | 50.0 |
| CBD isolate (50% CBD mixture) | 50.0 | 50.0 | 50.0 | 50.0 | 50.0 | 50.0 |
| Total | 100 | 100 | 100 | 100 | 100 | 100 |

Example 5

Premix: Miglyol Mixture with Isolated CBD Added to Mesoporous Carriers

A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was mixed with Medium Chain Triglyceride (MCT), Miglyol 812, provided from Sasol in an amount of about 500 g. While stirring, the CBD-MCT mixture was heated to a temperature of about 70 Degree Celsius to form a liquid solution of CBD in MCT. The mixture of CBD and Miglyol 812 was then added to the silica carrier powder composition in an amount of about 1000 g. After adding the lipid composition, the mixture was mixed for about 10 minutes. A total of 2000 g mixture powder premix was made.

TABLE 14

Miglyol 812 mixed with 99% purity CBD followed by heating (50% CBD mixture). Variation in the content of CBD (50% CBD mixture). Sample 503 corresponds to the procedure above, the other samples are adjusted to the variation in contents.

| Raw material name | Premix Number | | | | | | |
|---|---|---|---|---|---|---|---|
| | 500 Content [%] | 501 Content [%] | 502 Content [%] | 503 Content [%] | 504 Content [%] | 505 Content [%] | 506 Content [%] |
| Syloid XDP 3050 | 20.0 | 30.0 | 40.0 | 50.0 | 60.0 | 70.0 | 80.0 |
| CBD isolate (50% CBD mixture) | 80.0 | 70.0 | 60.0 | 50.0 | 40.0 | 30.0 | 20.0 |
| Total | 100 | 100 | 100 | 100 | 100 | 100 | 100 |

TABLE 15

Miglyol 812 mixed with 99% CBD followed by heating (X % CBD mixture). Variation in the content of CBD in mixture with Miglyol 812.

| Raw material name | Premix Number | | | | |
|---|---|---|---|---|---|
| | 510 Content [%] | 511 Content [%] | 512 Content [%] | 513 Content [%] | 514 Content [%] |
| Syloid XDP 3050 | 50.0 | 50.0 | 50.0 | 50.0 | 50.0 |
| CBD isolate (X % CBD mixture) | 50.0 (10%)* | 50.0 (30%)* | 50.0 (50%)* | 50.0 (80%)* | 50.0 (90%)* |
| Total | 100 | 100 | 100 | 100 | 100 |

*denotes the percentage X of CBD in "X % CBD mixture". Sample 512 corresponds to the procedure above, the other samples are adjusted to the variation in contents.

TABLE 16

Miglyol 812 mixed with 99% CBD followed by heating (50% CBD mixture). Variation in the type of carrier. Here Syloid XDP 3050 was replaced by other carriers. The samples are prepared according to the procedure above but adjusted to the variation in contents.

| Raw material name | Premix Number | | | | | |
|---|---|---|---|---|---|---|
| | 520 Content [%] | 521 Content [%] | 522 Content [%] | 523 Content [%] | 524 Content [%] | 525 Content [%] |
| Syloid XDP 3150 (from Grace) | | | 50.0 | | | |
| Aeroperl 300 (from Evonik) | 50.0 | | | | | |
| Prosolv 730 (from JRS Pharma) | | | | 50.0 | | |
| Omyanutra (from Omya) | | 50.0 | | | | |
| VivaPur 105 (from JRS Pharma) | | | | | 50.0 | |
| Neusilin ® US2 | | | | | | 50.0 |
| CBD isolate (50% CBD mixture) | 50.0 | 50.0 | 50.0 | 50.0 | 50.0 | 50.0 |
| Total | 100 | 100 | 100 | 100 | 100 | 100 |

Example 6

Premix: Comparative Samples—without Non-Volatile Solvent

A mesoporous silica carrier (Syloid XDP 3050) provided from Grace was added to a Lödige high shear mixer. Thereafter, a cannabinoid powder composition comprising CBD isolate from cannabis plant tissues (phytocannabinoid) with a purity about 99% of CBD provided by either Medical Hemp (batch number MH18592) or Valens (batch number BVA032013) was sieved through a 600 microns sieve and added to the silica carrier powder composition. This mixture was mixed at a speed of about 80 rpm for about 10 minutes. No solvent was present.

TABLE 17

Variation in the content of CBD isolate.

| Raw material name | Premix Number | | | | |
|---|---|---|---|---|---|
| | 600 Content [%] | 601 Content [%] | 602 Content [%] | 603 Content [%] | 604 Content [%] |
| Syloid XDP 3050 | 65.0 | 70.0 | 75.0 | 80.0 | 85.0 |
| CBD isolate (MH18592) | 35.0 | 30.0 | 25.0 | 20.0 | 15.0 |
| Total | 100 | 100 | 100 | 100 | 100 |

Example 7

Premix: Liquid Self-Emulsifying Systems with Isolated CBD and Mesoporous Carriers A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was sieved through a 600 microns sieve. The CBD was added to about 500 g of a composition comprising lipid and surfactant (SEDDS composition). After activation of the chopper (about 600 rpm) of the Lödige mixer, the SEDDS composition containing the CBD was added to the mixture. A total of 2 kg mixture powder premix was made in which the CBD content was about 250 mg/g. A co-solvent and/or a permeation enhancer could optionally be added. Also, one or more hydrophilic solvents could optionally be added.

TABLE 18

Variation in the content of CBD isolate (purity 99%). Sample 703 corresponds to the procedure above, the other samples are adjusted to the variation in contents.

| Raw material name | Premix Number | | | | | | |
|---|---|---|---|---|---|---|---|
| | 700 Content [%] | 701 Content [%] | 702 Content [%] | 703 Content [%] | 704 Content [%] | 705 Content [%] | 706 Content [%] |
| Syloid XDP 3050 | 20.0 | 30.0 | 40.0 | 50.0 | 60.0 | 70.0 | 80.0 |
| CBD isolate (purity 99%) | 40.0 | 35.0 | 30.0 | 25.0 | 20.0 | 15.0 | 10.0 |
| SEDDS composition | 40.0 | 35.0 | 30.0 | 25.0 | 20.0 | 15.0 | 10.0 |
| Total | 100 | 100 | 100 | 100 | 100 | 100 | 100 |

TABLE 19

Variation in the content of SEDDS. The samples are adjusted to the variation in contents.

| Raw material name | Premix Number | | | | |
|---|---|---|---|---|---|
| | 710 Content [%] | 711 Content [%] | 712 Content [%] | 713 Content [%] | 714 Content [%] |
| Syloid XDP 3050 | 50.0 | 50.0 | 50.0 | 50.0 | 50.0 |
| CBD isolate (purity 99%) | 45.0 | 40.0 | 20.0 | 10.0 | 5.0 |
| SEDDS composition | 5.0 | 10.0 | 30.0 | 40.0 | 45.0 |
| Total | 100 | 100 | 100 | 100 | 100 |

TABLE 20

Variation in the type of carrier. Here Syloid XDP 3050 was replaced by other carriers. The samples are prepared according to the procedure above but adjusted to the variation in contents.

| Raw material name | Premix Number | | | | | |
|---|---|---|---|---|---|---|
| | 720 Content [%] | 721 Content [%] | 722 Content [%] | 723 Content [%] | 724 Content [%] | 725 Content [%] |
| Syloid XDP 3150 (from Grace) | | | 50.0 | | | |
| Aeroperl 300 (from Evonik) | 50.0 | | | | | |
| Prosolv 730 (from JRS Pharma) | | | | 50.0 | | |
| Omyanutra (from Omya) | | 50.0 | | | | |
| VivaPur 105 (from JRS Pharma) | | | | | 50.0 | |
| Neusilin ® US2 | | | | | | 50.0 |
| CBD isolate (purity 99%) | 25.0 | 25.0 | 25.0 | 25.0 | 25.0 | 25.0 |
| SEDDS composition | 25.0 | 25.0 | 25.0 | 25.0 | 25.0 | 25.0 |
| Total | 100 | 100 | 100 | 100 | 100 | 100 |

Example 8

Premix: Solid Self-Emulsifying Systems with Isolated CBD and Mesoporous Carriers A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was sieved through a 600 microns sieve. The CBD was added to about 500 g of a composition comprising wax and surfactant (SEDDS composition). After activation of the chopper (about 600 rpm) of the Lödige mixer, the SEDDS composition containing the CBD was added to the mixture. A total of 2 kg mixture powder premix was made in which the CBD content was about 250 mg/g. A co-solvent and/or a permeation enhancer could optionally be added.

TABLE 21

Variation in the content of CBD isolate (purity 99%). Sample 80 corresponds to the procedure above, the other samples are adjusted to the variation in contents.

| Raw material name | Premix Number | | | | | | |
|---|---|---|---|---|---|---|---|
| | 800 Content [%] | 801 Content [%] | 802 Content [%] | 803 Content [%] | 804 Content [%] | 805 Content [%] | 806 Content [%] |
| Syloid XDP 3050 | 20.0 | 30.0 | 40.0 | 50.0 | 60.0 | 70.0 | 80.0 |
| CBD isolate (purity 99%) | 40.0 | 35.0 | 30.0 | 25.0 | 20.0 | 15.0 | 10.0 |
| SEDDS composition | 40.0 | 35.0 | 30.0 | 25.0 | 20.0 | 15.0 | 10.0 |
| Total | 100 | 100 | 100 | 100 | 100 | 100 | 100 |

TABLE 22

Variation in the content of SEDDS. The samples are adjusted to the variation in contents.

| | Premix Number | | | | |
|---|---|---|---|---|---|
| | 810 | 811 | 812 | 813 | 814 |
| Raw material name | Content [%] | Content [%] | Content [%] | Content [%] | Content [%] |
| Syloid XDP 3050 | 50.0 | 50.0 | 50.0 | 50.0 | 50.0 |
| CBD isolate (purity 99%) | 45.0 | 40.0 | 20.0 | 10.0 | 5.0 |
| SEDDS composition | 5.0 | 10.0 | 30.0 | 40.0 | 45.0 |
| Total | 100 | 100 | 100 | 100 | 100 |

TABLE 23

Variation in the type of carrier. Here Syloid XDP 3050 was replaced by other carriers. The samples are prepared according to the procedure above but adjusted to the variation in contents.

| | Premix Number | | | | | |
|---|---|---|---|---|---|---|
| | 820 | 821 | 822 | 823 | 824 | 825 |
| Raw material name | Content [%] | Content [%] | Content [%] | Content [%] | Content [%] | Content [%] |
| Syloid XDP 3150 (from Grace) | | | 50.0 | | | |
| Aeroperl 300 (from Evonik) | 50.0 | | | | | |
| Prosolv 730 (from JRS Pharma) | | | | 50.0 | | |
| Omyanutra (from Omya) | | 50.0 | | | | |
| VivaPur 105 (from JRS Pharma) | | | | | 50.0 | |
| Neusilin ® US2 | | | | | | 50.0 |
| CBD isolate (purity 99%) | 25.0 | 25.0 | 25.0 | 25.0 | 25.0 | 25.0 |
| SEDDS composition | 25.0 | 25.0 | 25.0 | 25.0 | 25.0 | 25.0 |
| Total | 100 | 100 | 100 | 100 | 100 | 100 |

Example 9

Premix: Solid Self-Emulsifying Systems with Isolated CBD

A cannabinoid powder composition comprising CBD isolate from cannabis plant tissues (phytocannabinoid) with a 99% content of CBD provided by Medical Hemp (batch number MH B18592) in an amount of about 400 g was sieved through a 600 microns sieve. The CBD was added to about 400 g of a composition comprising wax and surfactant (SEDDS composition). A total of 800 g mixture was made in which the CBD content was about 500 mg/g. A co-solvent and/or a permeation enhancer could optionally be added.

TABLE 24

Variation in the content of CBD isolate (purity 99%). Sample 903 corresponds to the procedure above, the other samples are adjusted to the variation in contents.

| | Premix Number | | | | | | |
|---|---|---|---|---|---|---|---|
| | 900 | 901 | 902 | 903 | 904 | 905 | 906 |
| Raw material name | Content [%] | Content [%] | Content [%] | Content [%] | Content [%] | Content [%] | Content [%] |
| CBD isolate (purity 99%) | 20.0 | 30.0 | 40.0 | 50.0 | 60.0 | 70.0 | 80.0 |
| SEDDS composition | 80.0 | 70.0 | 60.0 | 50.0 | 40.0 | 30.0 | 20.0 |
| Total | 100 | 100 | 100 | 100 | 100 | 100 | 100 |

Example 10

Premix: Solid Self-Emulsifying Systems with Isolated CBD and Permeation Enhancer A cannabinoid powder composition comprising CBD isolate from cannabis plant tissues (phytocannabinoid) with a 99% content of CBD provided by Medical Hemp (batch number MH B18592) in an amount of about 400 g was sieved through a 600 microns sieve. The CBD was added to about 400 g of a composition comprising wax, surfactant, and a permeation enhancer (SEDDS composition). A total of 800 g mixture was made in which the CBD content was about 500 mg/g.

TABLE 25

Variation in the content of CBD isolate (purity 99%). Sample 1003 corresponds to the procedure above, the other samples are adjusted to the variation in contents.

| Raw material name | Premix Number | | | | | | |
|---|---|---|---|---|---|---|---|
| | 1000 Content [%] | 1001 Content [%] | 1002 Content [%] | 1003 Content [%] | 1004 Content [%] | 1005 Content [%] | 1006 Content [%] |
| CBD isolate (purity 99%) | 20.0 | 30.0 | 40.0 | 50.0 | 60.0 | 70.0 | 80.0 |
| SEDDS composition | 30.0 | 70.0 | 60.0 | 50.0 | 40.0 | 30.0 | 20.0 |
| Total | 100 | 100 | 100 | 100 | 100 | 100 | 100 |

Example 11

Premix: Liquid Self-Emulsifying Systems with Isolated CBD and Permeation Enhancer A cannabinoid powder composition comprising CBD isolate from cannabis plant tissues (phytocannabinoid) with a 99% content of CBD provided by Medical Hemp (batch number MH B18592) in an amount of about 400 g was sieved through a 600 microns sieve. The CBD was added to about 400 g of a composition comprising lipid, surfactant, and a permeation enhancer (SEDDS composition). A total of 800 g mixture was made in which the CBD content was about 500 mg/g.

TABLE 26

Variation in the content of CBD isolate (purity 99%). Sample 1103 corresponds to the procedure above, the other samples are adjusted to the variation in contents.

| Raw material name | Premix Number | | | | | | |
|---|---|---|---|---|---|---|---|
| | 1100 Content [%] | 1101 Content [%] | 1102 Content [%] | 1103 Content [%] | 1104 Content [%] | 1105 Content [%] | 1106 Content [%] |
| CBD isolate (purity 99%) | 20.0 | 30.0 | 40.0 | 50.0 | 60.0 | 70.0 | 80.0 |
| SEDDS composition | 80.0 | 70.0 | 60.0 | 50.0 | 40.0 | 30.0 | 20.0 |
| Total | 100 | 100 | 100 | 100 | 100 | 100 | 100 |

Example 11A

Premix: Liquid Self-Emulsifying Systems with Isolated CBD and PEG and Non-PEG Surfactants A cannabinoid powder composition comprising CBD isolate from cannabis plant tissues (phytocannabinoid) with a 99% content of CBD provided by Medical Hemp (batch number MH B18592) in an amount of about 300 g was sieved through a 600 microns sieve. The CBD was added to about 700 g of a composition comprising lipid, surfactant, and hydrophilic solvent (SEDDS compositions A-Z). For each SEDDS composition a total of 1000 g mixture was made to produce loaded SEDDS A30-Z30 in which the CBD content was about 300 mg/g.

The above procedure was repeated with addition of CBD to SEDDS compositions A-Z to produce loaded SEDDS A25-Z25 in which the CBD content was about 250 mg/g.

The above procedure was further repeated with addition of CBD to SEDDS compositions A-Z to produce loaded SEDDS A20-Z20 in which the CBD content was about 200 mg/g.

TABLE 26A

Unloaded SEDDS formulations. Raw material content denoted by weight % (wt %).

| Raw material name | SEDDS A Content [%] | B Content [%] | C Content [%] | D Content [%] | E Content [%] |
|---|---|---|---|---|---|
| Benzyl alcohol | 14 | — | — | — | — |
| Propylene glycol | 10 | — | 31 | — | 30 |
| Alpha-tocopherol | 9 | — | — | — | — |
| Polyglyceryl-4 laurate/sebacate mixed with polyglyceryl-4 caprylate/caprate and water | 67 | — | — | — | — |
| Ascorbic acid palmitate | — | — | 2 | — | 2 |
| Sodium lauryl sulfate | — | — | 6 | — | 10 |
| Soy phosphatidylcholine | — | — | 5 | — | 6 |
| Medium chain triglycerides (C8-C10) | — | — | 20 | — | 22 |
| Glycerol monocaprylocaprate | — | — | 26 | — | 30 |
| Poloxamer 188 | — | — | 10 | — | — |
| Isopropyl myristate | — | 30 | — | 30 | — |
| Orange oil | — | 20 | — | 40 | — |
| Polyethylene lauryl ether | — | 50 | — | 30 | — |
| Total | 100 | 100 | 100 | 100 | 100 |

TABLE 26B

Unloaded SEDDS formulations. Raw material content denoted by weight % (wt %).

| Raw material name | SEDDS F Content [%] | G Content [%] | H Content [%] | I Content [%] | J Content [%] |
|---|---|---|---|---|---|
| Benzyl alcohol | — | 15 | — | — | — |
| Propylene glycol | — | — | — | 40 | — |
| Alpha-tocopherol | — | 9 | — | — | — |
| Polyglyceryl-4 laurate/sebacate mixed with polyglyceryl-4 caprylate/caprate and water | 61 | — | 61 | — | 61 |
| Ascorbic acid palmitate | — | — | — | 2 | — |
| Glycerol monocaprylocaprate | — | — | — | — | — |
| Poloxamer 188 | — | — | — | 39 | — |
| d-alpha-tocopheryl PEG-1000 succinate | — | 11 | — | — | — |
| Polyoxyethylene-23-laurylether | — | 65 | — | — | — |
| Polyglyceryl-3 dioleate | — | — | — | 19 | — |
| Orange oil | 22 | — | 22 | — | 22 |
| Caprylic acid | 6 | — | — | — | — |
| Capric acid | — | — | 6 | — | — |
| Oleyl alcohol | — | — | — | — | 6 |
| Ethanol | 11 | — | 11 | — | 11 |
| Total | 100 | 100 | 100 | 100 | 100 |

TABLE 26C

Unloaded SEDDS formulations. Raw material content denoted by weight % (wt %).

| Raw material name | SEDDS K Content [%] | L Content [%] | M Content [%] | N Content [%] | O Content [%] |
|---|---|---|---|---|---|
| Propylene glycol | — | — | 40 | — | — |
| Ascorbic acid palmitate | — | — | 2 | — | — |
| Soy phosphatidylcholine | 20 | 20 | — | 30 | — |
| Glycerol monocaprylocaprate | — | — | 19 | — | — |
| Poloxamer 188 | — | — | 39 | — | — |
| d-alpha-tocopheryl PEG-1000 succinate | 20 | 20 | — | 20 | 20 |
| Polyoxyethylene lauryl ether | — | 10 | — | — | — |

TABLE 26C-continued

Unloaded SEDDS formulations. Raw material content denoted by weight % (wt %).

| | SEDDS | | | | |
|---|---|---|---|---|---|
| Raw material name | K Content [%] | L Content [%] | M Content [%] | N Content [%] | O Content [%] |
| Isopropyl myristate | 30 | 30 | — | 30 | 30 |
| Orange oil | 20 | 20 | — | 20 | 40 |
| Polyoxyethylene (80) sorbitan monooleate | 10 | — | — | — | 10 |
| Total | 100 | 100 | 100 | 100 | 100 |

TABLE 26D

Unloaded SEDDS formulations. Raw material content denoted by weight % (wt %).

| | SEDDS | | | | |
|---|---|---|---|---|---|
| Raw material name | P Content [%] | Q Content [%] | R Content [%] | S Content [%] | T Content [%] |
| Benzyl alcohol | 10 | — | 21 | — | — |
| Propylene glycol | — | — | 35 | 41 | 31 |
| Alpha-tocopherol | 9 | — | — | — | — |
| Sodium dodecyl sulfate | — | — | 6 | — | 10 |
| Ascorbic acid palmitate | — | — | — | — | 2 |
| Soy phosphatidylcholine | 5 | — | 9 | — | 8 |
| Medium chain triglycerides (C8-C10) | — | — | — | 18 | — |
| Glycerol monocaprylocaprate | — | — | 29 | — | 10 |
| Poloxamer 188 | — | — | — | 41 | 20 |
| d-alpha-tocopheryl PEG-1000 succinate | 10 | 20 | — | — | — |
| Polyoxyethylene lauryl ether | 53 | 10 | — | — | — |
| Isopropyl myristate | 13 | 30 | — | — | — |
| Orange oil | — | 40 | — | — | — |
| Caprylic acid | — | — | — | — | 19 |
| Total | 100 | 100 | 100 | 100 | 100 |

TABLE 26E

Unloaded SEDDS formulations. Raw material content denoted by weight % (wt %).

| | SEDDS | | | | |
|---|---|---|---|---|---|
| Raw material name | U Content [%] | V Content [%] | X Content [%] | Y Content [%] | Z Content [%] |
| Ethanol | 7 | 23 | — | — | — |
| Propylene glycol | — | — | 30 | 30 | — |
| Propylene glycol dicaprylocaprate | 10 | — | — | — | — |
| Sodium dodecyl sulfate | — | — | 10 | 6 | — |
| Polyglyceryl-4 laurate/sebacate mixed with polyglyceryl-4 caprylate/caprate and water | 30 | — | — | — | — |
| Soy phosphatidylcholine | 3 | 7 | 6 | 6 | — |
| Medium chain triglycerides (C8-C10) | — | — | 22 | 20 | — |
| Glycerol monocaprylocaprate | — | — | 30 | 26 | — |
| Poloxamer 188 | — | — | — | 10 | — |
| d-alpha-tocopheryl PEG-1000 succinate | — | — | — | — | 20 |
| Polyoxyethylene lauryl ether | — | 20 | — | — | — |
| Orange oil | 20 | 20 | — | — | 20 |
| Polyglyceryl-3 dioleate | 10 | — | — | — | — |
| Polyglyceryl-4 oleyl ether olivate | 20 | — | — | — | — |
| Isopropyl myristate | — | 30 | — | — | 30 |
| Polyoxyethylene (80) sorbitan monooleate | — | — | — | — | 30 |
| Ascorbic acid palmitate | — | — | 2 | 2 | — |
| Total | 100 | 100 | 100 | 100 | 100 |

TABLE 26F

Variation in the content of CBD isolate (purity 99%). Sample 1143 corresponds to the procedure above yielding SEDDS with 30% load of CBD, the other samples are adjusted to the variation in contents.

| | Premix Number | | | | | | |
|---|---|---|---|---|---|---|---|
| Raw material name | 1140 Content [%] | 1141 Content [%] | 1142 Content [%] | 1143 Content [%] | 1144 Content [%] | 1145 Content [%] | 1146 Content [%] |
| CBD isolate (purity 99%) | 15.0 | 20.0 | 25.0 | 30.0 | 35.0 | 40.0 | 50.0 |
| SEDDS composition | 85.0 | 80.0 | 75.0 | 70.0 | 65.0 | 60.0 | 50.0 |
| Total | 100 | 100 | 100 | 100 | 100 | 100 | 100 |

Example 11B

SEDDS Characterization

In the Table below, characteristic properties of the SEDDS from Example 11A (in premix 1141 of Table 26F corresponding to a CBD load of 20%) are outlined in terms of the droplet size of the SEDDS and the zeta potential of the SEDDS, i.e., preloaded SEDDS with CBD. Both properties affect the properties of the SEDDS for mucus penetration.

The droplet size was measured for preloaded SEDDS with CBD emulsified 1:100 (v/v) in deionized water and incubated over 4 hours at 37 Degree Celsius at 300 rpm. Values are averages (n=4). The values were measured after 4 hours.

The zeta potential was measured for preloaded SEDDS with CBD emulsified 1:100 (v/v) in deionized water and incubated over 4 hours at 37 Degree Celsius at 300 rpm. Values are averages (n=4). The values were measured after 4 hours.

TABLE 27G

Measures after 4 hours. R and S measured after 72 hours. G and P measured after 24 hours.

| | SEDDS | |
|---|---|---|
| Samples | Droplet size nm | Zeta potential mV |
| A20 | 199 | −33 |
| B20 | n.a. | n.a. |
| C30 | 187 | −1 |
| D20 | 230 | −2 |
| E30 | 187 | −1 |
| F20 | 80 | 0 |
| G20 | 150 | −2 |
| H20 | 78 | −3 |
| I30 | 132 | −4 |
| J20 | 200 | −10 |
| K20 | 250 | −4 |
| L20 | n.a. | n.a. |
| M30 | 182 | −1 |
| N20 | 250 | −1 |
| O20 | 210 | −5 |
| P20 | 230 | −2 |
| Q20 | n.a. | n.a. |
| R30 | 220 | n.a. |
| S30 | 102 | n.a. |
| T30 | 271 | −24 |
| U20 | n.a. | n.a. |

TABLE 27G-continued

Measures after 4 hours. R and S measured after 72 hours. G and P measured after 24 hours.

| | SEDDS | |
|---|---|---|
| Samples | Droplet size nm | Zeta potential mV |
| V20 | n.a. | n.a. |
| X30 | 139 | −2 |
| Y30 | 136 | −41 |
| Z20 | 600 | −1 |

Example 12

Premix: Self-Emulsifying Systems with Isolated CBD

A cannabinoid powder composition comprising CBD isolate from cannabis plant tissues (phytocannabinoid) with a 99% content of CBD provided by Medical Hemp (batch number MH B18592) in an amount of about 400 g was sieved through a 600 microns sieve. The CBD was added to about 400 g of a SEDDS composition according to Table 27. A total of 800 g mixture was made in which the CBD content was about 500 mg/g.

TABLE 27

SEDDS formulations. Raw material content denoted by volume % (vol. %).

| | SEDDS | | | | |
|---|---|---|---|---|---|
| Raw material name | AA Content [vol. %] | BB Content [vol. %] | CC Content [vol. %] | DD Content [vol. %] | EE Content [vol. %] |
| Kolliphor EL (from BASF) | 33 | 27 | 50 | — | — |
| Labrafil M 1944 CS (from Gattefossé) | 34 | 26 | 20 | — | — |
| Oleic acid (from Acme Synthetic Chemicals) | — | — | — | 50 | 40 |
| Maisine CC (from Gattefossé) | 33 | 27 | 30 | 50 | 40 |
| Transcutol (from Gattefossé) | — | 20 | — | — | 20 |
| Total | 100 | 100 | 100 | 100 | 100 |

TABLE 28

Variation in the content of CBD isolate (purity 99%). Sample 1203 corresponds to the procedure above, the other samples are adjusted to the variation in contents.

| Raw material name | Premix Number | | | | | | |
|---|---|---|---|---|---|---|---|
| | 1200 Content [%] | 1201 Content [%] | 1202 Content [%] | 1203 Content [%] | 1204 Content [%] | 1205 Content [%] | 1206 Content [%] |
| CBD isolate (purity 99%) | 20.0 | 30.0 | 40.0 | 50.0 | 60.0 | 70.0 | 80.0 |
| SEDDS composition (Table 27) | 80.0 | 70.0 | 60.0 | 50.0 | 40.0 | 30.0 | 20.0 |
| Total | 100 | 100 | 100 | 100 | 100 | 100 | 100 |

Example 13

Premix: Self-Emulsifying Systems with Isolated CBD and Carriers

A mesoporous silica carrier (Syloid XDP 3050) provided from Grace in an amount of about 1000 g was added to a Lödige high shear mixer. Thereafter, a cannabinoid powder composition comprising CBD isolate from cannabis plant tissues (phytocannabinoid) with a 99% content of CBD provided by Medical Hemp (batch number MH B18592) in an amount of about 500 g was sieved through a 600 microns sieve. The CBD was added to about 500 g of a SEDDS composition according to Example 12, Table 27, as well as Example 11A, Tables 26A-26F. After activation of the chopper (about 600 rpm) of the Lödige mixer, the SEDDS composition containing the CBD was added to the mixture. A total of 2 kg mixture powder premix was made in which the CBD content was about 250 mg/g. A permeation enhancer could optionally be added.

TABLE 29

Variation in the content of CBD isolate (purity 99%). Sample 1303 corresponds to the procedure above, the other samples are adjusted to the variation in contents.

| Raw material name | Premix Number | | | | | | |
|---|---|---|---|---|---|---|---|
| | 1300 Content [%] | 1301 Content [%] | 1302 Content [%] | 1303 Content [%] | 1304 Content [%] | 1305 Content [%] | 1306 Content [%] |
| Syloid XDP 3050 | 20.0 | 30.0 | 40.0 | 50.0 | 60.0 | 70.0 | 80.0 |
| CBD isolate (purity 99%) | 40.0 | 35.0 | 30.0 | 25.0 | 20.0 | 15.0 | 10.0 |
| SEDDS composition | 40.0 | 35.0 | 30.0 | 25.0 | 20.0 | 15.0 | 10.0 |
| Total | 100 | 100 | 100 | 100 | 100 | 100 | 100 |

TABLE 30

Variation in the content of SEDDS and CBD. The samples are adjusted to the variation in contents.

| Raw material name | Premix Number | | | | |
|---|---|---|---|---|---|
| | 1310 Content [%] | 1311 Content [%] | 1312 Content [%] | 1313 Content [%] | 1314 Content [%] |
| Syloid XDP 3050 | 50.0 | 50.0 | 50.0 | 50.0 | 50.0 |
| CBD isolate (purity 99%) | 45.0 | 40.0 | 20.0 | 10.0 | 5.0 |
| SEDDS composition | 5.0 | 10.0 | 30.0 | 40.0 | 45.0 |
| Total | 100 | 100 | 100 | 100 | 100 |

TABLE 31

Variation in the type of carrier. Here Syloid XDP 3050 was replaced by other carriers.

| Raw material name | Premix Number | | | | |
|---|---|---|---|---|---|
| | 1320 Content [%] | 1321 Content [%] | 1322 Content | 1323 Content [%] | 1324 Content [%] |
| Syloid XDP 3150 (from Grace) | | | 50.0 | | |
| Aeroperl 300 (from Evonik) | 50.0 | | | | |
| Prosolv 730 (from JRS Pharma) | | | | 50.0 | |
| Omyanutra (from Omya) | | 50.0 | | | |
| VivaPur 105 (from JRS Pharma) | | | | | 50.0 |
| CBD isolate (purity 99%) | 25.0 | 25.0 | 25.0 | 25.0 | 25.0 |
| SEDDS composition | 25.0 | 25.0 | 25.0 | 25.0 | 25.0 |
| Total | 100 | 100 | 100 | 100 | 100 |

The samples are prepared according to the procedure above but adjusted to the variation in contents.

Example 14

Preparation of Chewable Tablets with Two Layers Based on Examples 1 to 8 and 13

Tablets were made based on the CBD containing mixtures of Examples 1-8 and 13 with each layer having a weight of about 50% of the total tablet. The total weight of the tablets were 1800 mg. The tablets were made with a standard tablet pressing machine (3090i, available from Fette GmbH) comprising dosing apparatus (P 3200 C, available from Fette GmbH, Germany). Punch used: 16.00 mm round punches. Rotor speed used was 11 rpm.

A first layer (denoted layer 1) comprising the CBD containing mixture made in Examples 1-8 and 13 and additional ingredients was prepared and tableted before tableting the layer comprising gum base (denoted layer 2). Layer 1 with a weight of about 900 mg was compressed at a compression force of about 5 kN. Hereafter, layer 2 with a weight of about 900 mg and comprising gum base and additional ingredients was pressed on top of layer 1 at a compression force of 40 kN. The tablet machine was commissioned by adjusting the fill depth and compression force so the weight and hardness of tablets match the acceptance criteria. A pre-compression force could be included to avoid capping.

TABLE 32

In all of the tablet examples, the amount of the various ingredients is given as % by weight of the tablet.

| Raw material name | Content [%] Layer 1 - 900 mg | Content [%] Layer 2 - 900 mg |
|---|---|---|
| Premix Sample from one of Examples 1 to 8 and 13 | 16.1 | |
| Flavors | 1.2 | 1.8 |
| High-intensity sweeteners | 0.1 | 0.3 |
| Lubricant | 3.0 | 3.0 |
| Mannitol | 29.6 | |
| Xylitol | | 12.7 |
| Gum base | | 31.5 |
| Other components | | 0.7 |
| Total | 50 | 50 |

TABLE 33

In all of the tablet examples, the amount of the various ingredients is given as % by weight of the tablet.

| Raw material name | Content [%] Layer 1 - 900 mg | Content [%] Layer 2 - 900 mg |
|---|---|---|
| Premix Sample from one of Examples 1 to 8 and 13 | 24.2 | |
| Flavors | 1.2 | 1.8 |
| High-intensity sweeteners | 0.1 | 0.3 |
| Lubricant | 3.0 | 3.0 |
| Mannitol | 21.5 | |
| Xylitol | | 12.7 |
| Gum base | | 31.5 |
| Other components | | 0.7 |
| Total | 50 | 50 |

TABLE 34

In all of the tablet examples, the amount of the various ingredients is given as % by weight of the tablet.

| Raw material name | Content [%] Layer 1 - 900 mg | Content [%] Layer 2 - 900 mg |
|---|---|---|
| Premix Sample from one of Examples 1 to 8 and 13 | 24.2 | 16.1 |
| Flavors | 1.2 | 1.8 |
| High-intensity sweeteners | 0.1 | 0.3 |
| Lubricant | 3.0 | 3.0 |
| Mannitol | 21.5 | |
| Xylitol | | 28.1 |
| Other components | | 0.7 |
| Total | 50 | 50 |

Example 15

Preparation of Chewable Tablets with Two Layers Based on Examples 9-12 and 11A

Tablets were made based on the CBD containing mixtures of Examples 9-12, as well as Example 11A, Tables 26A-26F, with each layer having a weight of about 50% of the total tablet. The total weight of the tablets were 1800 mg. The tablets were made with a standard tablet pressing machine (3090i, available from Fette GmbH) comprising dosing apparatus (P 3200 C, available from Fette GmbH, Germany). Punch used: 16.00 mm round punches. Rotor speed used was 11 rpm.

A first layer (denoted layer 1) comprising the CBD containing mixture made in Examples 9-12, as well as Example 11A, Tables 26A-26F, and additional ingredients was prepared and tableted before tableting the layer comprising gum base (if present) (denoted layer 2). Layer 1 with a weight of about 900 mg was compressed at a compression force of about 5 kN. Hereafter, layer 2 with a weight of about 900 mg and comprising gum base and additional ingredients was pressed on top of layer 1 at a compression force of 40 kN. The tablet machine was commissioned by adjusting the fill depth and compression force so the weight and hardness of tablets match the acceptance criteria. A pre-compression force could be included to avoid capping.

TABLE 35

In all of the tablet examples, the amount of the various ingredients is given as % by weight of the tablet.

| Raw material name | Content [%] Layer 1 - 900 mg | Content [%] Layer 2 - 900 mg |
|---|---|---|
| Premix Sample from one of Examples 9 to 12 and 11A | 20.0 | |
| Flavors | 1.2 | 1.8 |
| High-intensity sweeteners | 0.1 | 0.3 |
| Lubricant | 3.0 | 3.0 |
| Mannitol | 25.7 | |
| Xylitol DC | | 12.7 |
| Gum base | | 31.5 |
| Other components | | 0.7 |
| Total | 50 | 50 |

TABLE 36

In all of the tablet examples, the amount of the various ingredients is given as % by weight of the tablet.

| Raw material name | Content [%] Layer 1 - 900 mg | Content [%] Layer 2 - 900 mg |
|---|---|---|
| Premix Sample from one of Examples 9 to 12 and 11A | 20 | 10 |
| Flavors | 1.2 | 1.8 |
| High-intensity sweeteners | 0.1 | 0.3 |
| Lubricant | 3.0 | 3.0 |
| Mannitol | 21.5 | |
| Xylitol DC | | 34.2 |
| Other components | | 0.7 |
| Total | 50 | 50 |

TABLE 37

In all of the tablet examples, the amount of the various ingredients is given as % by weight of the tablet.

| Raw material name | Content [%] Layer 1 - 900 mg | Content [%] Layer 2 - 900 mg |
|---|---|---|
| Premix Sample from one of Examples 9 to 12 and 11A | 24.2 | 16.1 |
| Flavors | 1.2 | 1.8 |
| High-intensity sweeteners | 0.1 | 0.3 |
| Lubricant | 3.0 | 3.0 |
| Mannitol | 21.5 | |
| Xylitol DC | | 28.1 |
| Other components | | 0.7 |
| Total | 50 | 50 |

Example 16

Test Method for Content Uniformity in Premixtures and Powder Blends

Content Uniformity (CU), ie. homogeneity of the CBD active substance in premixtures (Premix Samples) as well as powder blends which are mixtures with additional ingredients to be processed into the oral dosage form (Powder Blends), is determined according to European Pharmacopoeia 10.8 using test method 2.9.40 Uniformity of dosage units.

At least 5 samples each having the same fixed weight in the range of 0.25-2 gram are taken from the powder mixture to be analyzed. For each sample, the content of CBD active is analyzed by means of standard HPLC techniques. Content Uniformity is then calculated as the relative standard deviation (RSD) of the individual results.

This test included tests on powders for pouches, sachets, and stick packs. Also, this test was made to other cannabinoids, including THC.

Example 17

Test Method for Content Uniformity in Solid Dosage Forms

Content Uniformity (CU), ie. homogeneity of the CBD active substance in solid dosage forms, is determined according to European Pharmacopoeia 10.8 using test method 2.9.40 Uniformity of dosage units.

At least 10 samples are taken from the solid dosage form, eg. tablets, to be analyzed. For each sample, the content of CBD active is analyzed by means of standard HPLC techniques. Content Uniformity is then calculated as the relative standard deviation (RSD) of the individual results.

This test was included tests on chewable tablets, compressed chewing gums, and lozenges comprising particulate ingredients. Also, this test was made to other cannabinoids, including THC.

Example 18

In Vivo Testing of Release in Solid Dosage Forms

A sample solid dosage form was tested in a test panel of 8 test persons. Test subjects abstain from eating and drinking at least 30 minutes before initiation of any test. The test person was a healthy person appointed on an objective basis according to specified requirements. After specific time intervals of use, eg. 0, 0.5, 1, 2, 3, 5 and 10 minutes, the content of CBD was measured in the remaining solid dosage residue. The solid dosage form was subject to triple measurements for each of the 8 test persons, giving a total of 24 measurements for each sample. An average of the 24 measurements was calculated and the weight % release was calculated based on the original content of CBD in the sample. The content of CBD was measured in the remaining solid dosage form residue, if still present.

The solid dosage form was weighted and placed in the mouth, and the test persons were instructed to place and use the solid dosage form as intended. For chewing gum, the test persons were instructed to chew the sample at a frequency of 60 chews per minute. For lozenges the test persons were instructed to place the sample between the tongue and the palate, and then the solid dosage form was sucked and turned every 0.5 minute. Once the desired test time was achieved (0.5, 1, 2, 3, 5 and 10 min.), the solid dosage form was taken out and weighed directly into a measuring glass to be used for analysis of CBD content. An in vivo dissolution profile was obtained by analyzing the content of CBD in the solid dosage form at different dissolution times.

This test was made to chewable tablets, chewing gums, and lozenges comprising particulate ingredients. Also, this test was made to other cannabinoids, including THC.

Example 19

In Vitro Testing of Release in Solid Dosage Forms

A sample solid dosage form was tested. After specific time intervals of use, eg 0, 0.5, 1, 2, 3, 5 and 10 minutes, the content of CBD was measured in the remaining solid dosage residue. The solid dosage form was subject to triple measurements. An average of the measurements was calculated and the weight % release was calculated based on the original content of CBD in the sample. The content of CBD was measured in the remaining solid dosage form residue, if still present.

The solid dosage form was weighted. Then 25 ml of phosphate buffer was added into a 50 ml measuring tube with screw cap. The solid dosage form was added to the tube. The tube was fixed horizontally on a shaking table. After shaking, the solid dosage form was analyzed for content of CBD. An in vitro profile was obtained by analyzing the content of the CBD in the solid dosage at different dissolution times.

This test was made to tablets, chewing gum, and lozenges comprising particulate ingredients. Also, this test was made to other cannabinoids, including THC.

Example 20

In Vitro Testing of Release from Premixtures

Corresponding tests were made on premixtures of Examples 1-8 and 13 in accordance with the procedure outline in Example 19.

Example 21

In Vitro Testing of Release from Powder Blends

Corresponding tests were made on powder blends comprising premixtures of Examples 1-8 and 13 in accordance with the procedure outline in Example 19.

The powder blends included tests on powders for pouches, sachets, and stick packs.

Example 22

Sensoric Evaluation Test Set-Up of Solid Dosage Forms

In addition to release measurements, either in vivo or in vitro, sensoric tests were performed to reveal very important characteristics and properties of the solid dosage form and powder blends. These sensoric parameters are important as indicators of the structure of the solid dosage form composition. The structure is the underlying guidance as to how the solid dosage form resembles the structure of a comparative solid dosage form, which is set as the standard in the test series, i.e. the solid dosage forms are compared to each other in the test series of preferably 5 samples. The test set-up was composed of 8 test persons in a test panel. All of the test persons were healthy individuals appointed on an objective basis according to specified requirements. The sensory analysis was performed according to ISO 4121-2003 in testing conditions following ISO 8589. The result is an average of the results of the 8 individuals.

The test persons gave a rating from "+" to "+++++", where "+" is poor and "+++++" is excellent, i.e. "+++++" means that the solid dosage form was excellent compared to the standard, "+++" means that the solid dosage form was comparable to the standard and "+" means that the solid dosage form was very far from comparable to the standard. "0" indicated that it was not tested.

Four different parameters were tested in a test panel:

| Sandy-texture | Flavor | Sweetness | Off-notes | Creaking |
| --- | --- | --- | --- | --- |

"Sandy Texture"—the general impression of the solid dosage form when placed in the mouth with respect to the impression of particulate roughness, i.e., a sandy feeling in the mouth upon administration.

"Flavor"—the overall impression of the solid dosage form during intended use with respect to flavor. For instance, a very low flavor experience gave a very low rating and a too high flavor experience that was not comparable to the standard also gave a very low rating.

"Sweetness"—the overall impression of the taste of the solid dosage form during intended use with respect to sweetness. For instance, if the sweetness was decreasing rapidly, a very low rating was given and if the sweetness was too high giving an uncomfortable feeling, a very low rating was also given.

"Off-notes"—the overall impression of the off-note from the one or more cannabinoids in the composition during intended use. For instance, if off-notes (grass, bitter notes, irritation in the throat) were experienced in the throat, a low rating was given and if other uncomfortable sensations was experienced, a low rating was also given.

"Creaking sound"—the overall impression upon mastication of a chewable solid dosage form with respect to invoking a creaking feeling upon contact with the teeth. For instance, if a creaking sound was experienced, a low rating was given.

Example 23

Results on Content Uniformity in Premixtures

The procedures of Example 16 was used for the premixes (Premix Samples) above and the results revealed a surprisingly good content of uniformity of the inventive samples. The result of content uniformity for a sample was revealed as a single value obtained as the relative standard deviation (RSD) of CBD content of multiple samples taken at the end of the premix preparation procedures.

Example 24

Results on Content Uniformity in Powder Blends and Solid Dosage Forms

The procedures of Example 16 was used for powder blends (Powder Blends) which are powder premixes (Powder Premix Samples) with additional ingredients as outlined in the formulations of the oral dosage forms. The powder blends included tests on powders for pouches, sachets, and stick packs as well as powder blends for use in the solid dosage forms, including chewable tablets, chewing gums, and lozenges comprising particulate ingredients according to the previous examples. The procedure of Example 17 was used for the solid dosage forms.

The result of content uniformity (CU) for a sample is provided as a single value obtained as the relative standard deviation (RSD) of CBD content of multiple samples taken at the end of the preparation procedures. If individual samples have been collected at different stages of a tableting process (eg. start, middle, end) then content uniformity is determined by analysis of pooled samples from the different process stages. The results revealed a surprisingly good content of uniformity of the inventive samples.

Example 25

Results on Release from Solid Dosage Forms

The procedures of Example 19 was made on solid dosage forms according to the previous examples. The results revealed a surprisingly good release of the inventive samples. Similar good results were seen for tablets without gum base, FDT tablets, compressed chewing gums, and lozenges.

Example 26

Results on Release from Premixtures

The procedures of Example 20 was made on premixtures according to the previous examples. The results revealed a surprisingly good release of the inventive samples.

Example 27

Results on Release from Powder Blends

The procedures of Example 21 was made on powder blends according to the previous examples. The results revealed a surprisingly good release of the inventive samples. Good results were seen for powders according to the previous examples for use in pouches, sachets, stick packs, and flowpacks.

Example 28

Results on Sensoric Evaluation Test Set-Up of Solid Dosage Forms

The procedures of Example 22 was made in order to establish benefits of the sensory properties of the solid samples of the instant application. Surprisingly good results were seen for chewable tablets with or without gum base, FDT tablets, compressed chewing gums, and lozenges.

Example 29

Degradability of Selected SEDDS

Effect studies were made to establish the effect of degradability on selected SEDDS from Example 11A, Tables 26A-26F. For SEDDS A, G, P the load of CBD in the SEDDS was 20% by weight of the SEDDS (as outlined in Table 26F in Example 11A). For SEDDS C, E, I, M the load of CBD in the SEDDS was 30% by weight of the SEDDS (as outlined in Table 26F in Example 11A).

The studies were made in vitro based on release of fatty acids (in mmole) from SEDDS formulations after treatment with lipase for 60 min (incubation time). The content of released fatty acids was an indication of degradability. A blank sample was prepared for valuation of the results.

TABLE 38

Release of fatty acids measured in millimole as a function of time.

| SEDDS | 0 min | 5 min | 10 min | 20 min | 30 min | 40 min | 50 min | 60 min |
|---|---|---|---|---|---|---|---|---|
| A20 | 0.00 | 0.04 | 0.07 | 0.10 | 0.15 | 0.18 | 0.27 | 0.32 |
| C30 | 0.00 | 0.05 | 0.08 | 0.10 | 0.13 | 0.14 | 0.15 | 0.16 |
| E30 | 0.00 | 0.06 | 0.09 | 0.13 | 0.15 | 0.16 | 0.17 | 0.18 |

TABLE 38-continued

Release of fatty acids measured in millimole as a function of time.

| SEDDS | 0 min | 5 min | 10 min | 20 min | 30 min | 40 min | 50 min | 60 min |
|---|---|---|---|---|---|---|---|---|
| G20 | 0.00 | 0.00 | 0.00 | 0.00 | 0.00 | 0.00 | 0.00 | 0.00 |
| I30 | 0.00 | 0.00 | 0.00 | 0.00 | 0.01 | 0.01 | 0.01 | 0.01 |
| M30 | 0.00 | 0.04 | 0.05 | 0.06 | 0.07 | 0.08 | 0.08 | 0.09 |
| P20 | 0.00 | 0.00 | 0.00 | 0.00 | 0.00 | 0.00 | 0.00 | 0.00 |

The results revealed that certain SEDDS with a relatively low amount of PEG containing surfactants degraded relatively fast, such as sample A20, C30 and E30. On the other hand, SEDDS with a relatively high amount of PEG containing surfactants degraded to a less degree. This trend was as expected since the PEG moiety in the surfactants was expected to protect the SEDDS from degradation.

Example 30

Effect Studies

Effect studies were made to establish the plasma pharmacokinetics (PK) profile in Sprague Dawley rats of selected SEDDS from Example 11A, Tables 26A-26F. The load of CBD in the SEDDS was about 20% by weight of the SEDDS (as outlined in Table 26F in Example 11A).

Samples with preloaded SEDDS with CBD (in deionized water) were administered to the rats by standard oral gavage techniques, i.e., by means of a tube delivering the SEDDS in the stomach of the rats.

The studies were made by orally administering 6.643 CBD mg/kg rat, equivalent of a human (70 kg) consuming 75 mg of CBD. The plasma CBD concentration (mg/mL) was measured after certain time intervals revealing the in vivo uptake of CBD. Values are averages (n=7). A reference Epidiolex® was applied.

The area under the curve (AUC) was established for the periods 0 to 240 minutes as well as 0 to 1440 minutes, corresponding to the total test period. The values were applied to establish uptake in the rats at short time scales (0 to 240 minutes) and uptake in the rats at long time scales (240 to 1440 minutes) as well as to measure the total uptake of CBD in the rats over the complete time period.

Additionally, the maximum plasma concentration (Cmax) was determined.

TABLE 38

The area under the curve (AUC) was established for the periods (indicated in minutes from time 0 to various time points) as mean values (n = 7). The values are indicated in minutes multiplied by nanogram CBD per milliliter. Also, a percentage was calculated.

| | SEDDS | | | |
|---|---|---|---|---|
| No. | AUC 0-240 min*ng/mL | AUC 0-1440 min*ng/mL | AUC 0-240 % of AUC 0-1440 | AUC 0-1440-AUC 0-240 min*ng/mL |
| A20 | 4152 | 10337 | 40.2 | 6185 |
| P20 | 3706 | 8575 | 43.2 | 4869 |
| G20 | 4535 | 8482 | 53.5 | 3947 |
| Epidiolex ® | 1988 | 8428 | 23.6 | 6440 |

As can be seen from the results of the AUC, it is evident that G20 (having a high content of PEG containing surfactants) provides a much faster uptake of 53.5% within 240 minutes of the total uptake after 1440 minutes compared to A20 (having no content of PEG containing surfactants) with a value of 40.2% and a faster uptake than P20 (having a lower content of PEG containing surfactant than G20) with a value of 43.2% within 240 minutes of the oral uptake after 1440 minutes. This was highly surprising since it was theoretically expected that PEG containing surfactants would be propose to steric hindrance in terms of cell uptake. However, the direct opposite occurred compared to SEDDS having less or no PEG containing surfactants.

Additionally, compared the Epidiolex®, the results were even more pronounced in that the uptake for Epidiolex® within 240 minutes was 23.6% of the total oral uptake after 1440 minutes. Hence, also for SEDDS containing no surfactants containing PEG (here A20 with a value of 40.2%), the uptake at short time scales was higher than that of the reference, Epidiolex®.

Since the uptake at short time scales (0 to 240 minutes) was considerably higher for SEDDS with PEG containing surfactants, one perspective is to apply these SEDDS for faster uptake of cannabinoids, such as CBD, for instance in combination with SEDDS systems providing sustained uptake.

As can also be seen from the results of the AUC, the total uptake (0 to 1440 minutes) was significantly higher for A20 than all the other SEDDS and Epidiolex®, i.e., a value of 10337 min*ng/mL was seen for SEDDS A20 with surfactants that did not include PEG moieties, which was considerably higher than SEDDS having a high content of surfactants with PEG (8482 for G20 and 8575 for P20), and even compared to Epidiolex®. This was highly unexpected and surprising, since the degradability studies revealed in Example 29 showed that these SEDDS (with surfactants that did not include PEG moieties) were degraded. To the contrary, despite this degradation, the uptake was very high and much higher than SEDDS that did not degrade as revealed in Example 29. Hence, the total uptake (at both short and long time scales) was unexpectedly higher for SEDDS with surfactants that did not include a PEG moiety.

Furthermore, as can be seen from the results of the AUC, the uptake at long time scales (within 240 to 1440 minutes) was also significantly higher for SEDDS having surfactants that did not include PEG moieties with a value of 6185 min*ng/mL compared to SEDDS having surfactants with PEG containing moieties with values of 4869 and 3947 min*ng/mL. This is evidence for a higher uptake of those SEDDS at long time scales compared to the other SEDSS in the test. This was also highly surprising since the degradability tests in Example 29 revealed degradation of these SEDDS. Highly unexpected, the uptake was higher at long time scales despite this fact and comparable to the reference, Epidiolex®. One perspective is to apply these SEDDS for more sustained uptake of cannabinoids, such as CBD, for instance in combination with SEDDS systems providing faster uptake.

TABLE 39

The maximum concentration Cmax in nanogram per milliliter indicated for selected samples and a reference Epidiolex ®.

| No. | SEDDS Cmax ng/mL |
|---|---|
| A20 | 34.8 |
| P20 | 30.6 |
| G20 | 35.8 |
| Epidiolex ® | 25.0 |

As can be seen from the results of Cmax, the maximum concentration of A20, G20 and P20 was much higher than the reference, Epidiolex®. Hence, these SEDDS performed better in terms of peak concentration than the reference, i.e., the possible maximum plasma concentration level obtainable is higher. This was highly surprising, since for SEDDS having surfactants with PEG moieties (G20 and P20), it was expected that steric hindrance due to the PEG moieties would affect the uptake negatively. However, the results evidence that this was not the case. As for SEDDS having surfactants with no PEG moieties (A20), this was also unexpected in view of the degradability studies revealed in Example 29, where it was shown that those SEDDS degraded significantly.

The invention claimed is:

1. An orally dissolvable or chewable tableted powder formulation, comprising:
   one or more carrier systems present in a total amount of 30 to 1500 mg in the orally dissolvable or chewable tableted powder formulation, the one or more carrier systems comprising one or more liquid self-emulsifying systems loaded with cannabinoids in a total amount of at least 10% by weight of the tableted powder formulation; the one or more liquid self-emulsifying systems including: at least one or more surfactants, one or more lipids, one or more hydrophilic solvents, and one or more isolated or synthetic cannabinoids;
   one or more water-soluble agents comprising one or more sugar alcohol particles in a total amount of 20-80% by weight of the tableted powder formulation; and
   one or more flavors,
   wherein said one or more liquid self-emulsifying systems as a whole is liquid at 25 Degrees Celsius and stable at a pH of about 1-4 and operable to gastrointestinal tract delivery of the one or more cannabinoids upon release of the one or more carrier systems in the oral cavity.

2. The orally dissolvable or chewable tableted powder formulation according to claim 1, wherein the one or more lipids comprises one or more oils.

3. The orally dissolvable or chewable tableted powder formulation according to claim 1, wherein the one or more lipids is present in a total amount of 1 to 30% by weight of the orally dissolvable or chewable tableted powder formulation.

4. The orally dissolvable or chewable tableted powder formulation according to claim 1, wherein the one or more surfactants is selected from the group consisting of PEG-35 castor oil, PEG-6 oleoyl glycerides, PEG-6 linoleoyl glycerides, PEG-8 caprylic/capric glyceride, sorbitan monolaurate, sorbitan monooleate, polyoxyethylene (20) sorbitan monolaurate, polyoxyethylene (60) sorbitan monostearate, polyoxyethylene (80) sorbitan monooleate, lauroylpoloxyl-32 glycerides, stearoyl polyoxyl-32 glycerides, polyoxyl-32 stearate, propylene glycol mono laurate, propylene glycol di laurate, and mixtures and combinations thereof.

5. The orally dissolvable or chewable tableted powder formulation according to claim 1, wherein the one or more self-emulsifying systems further comprises one or more solubilizers selected from the group consisting of lauroylpoloxyl-32 glycerides; stearoyl polyoxyl-32 glycerides; Polyoxyl-32 stearate; synthetic copolymer of ethylene oxide (80) and propylene oxide (27); polyvinyl caprolactam-polyvinyl acetate-polyethylene glycol graft co-polymer; alpha-, beta- or gamma cyclodextrins and derivatives thereof; pea proteins (globulins, albumins, glutelins proteins); and mixtures and combinations thereof.

6. The orally dissolvable or chewable tableted powder formulation according to claim 1, wherein the one or more isolated or synthetic cannabinoids is present in an amount of at least 40 mg in the orally dissolvable or chewable tableted powder formulation.

7. The orally dissolvable or chewable tableted powder formulation according to claim 1, wherein the one or more carrier systems comprises one or more mesoporous silica carriers.

8. The orally dissolvable or chewable tableted powder formulation according to claim 1, wherein the one or more self-emulsifying systems comprises the one or more isolated or synthetic cannabinoids and one or more lipids in a weight ratio of cannabinoid to lipid of 10:1 to 1:10.

9. The orally dissolvable or chewable tableted powder formulation according to claim 1, wherein the one or more surfactants comprises one or more surfactants having a chemical structure that includes a polyethylene glycol (PEG) moiety.

10. The orally dissolvable or chewable tableted powder formulation according to claim 1, wherein the one or more surfactants comprises one or more surfactants having a chemical structure that includes a polyethylene glycol (PEG) moiety being selected from the group consisting of sugar-lipid based surfactants with PEG modification, PEG containing polymer based surfactants, PEGylated emulsifiers, and combinations thereof.

11. The orally dissolvable or chewable tableted powder formulation according to claim 1, wherein the one or more surfactants comprises one or more surfactants having a chemical structure that includes a polyethylene glycol (PEG) moiety being sugar-lipid based surfactants with PEG modification selected from the group consisting of polyoxyethylene (20) sorbitan monolaurate, polyoxyethylene (20) sorbitan monooleate, polyoxyethylene (20) sorbitan monopalmitate, polyoxyethylene (20) sorbitan monostearate, polyoxyethylene (20) sorbitan trioleate, and combinations thereof.

12. The orally dissolvable or chewable tableted powder formulation according to claim 1, wherein the one or more surfactants comprises one or more surfactants having a chemical structure that includes a polyethylene glycol (PEG) moiety being PEG containing polymer based surfactants selected from the group consisting of poloxamer 124, poloxamer 188, poloxamer 338, poloxamer 407, and combinations thereof.

13. The orally dissolvable or chewable tableted powder formulation according to claim 1, wherein the one or more surfactants comprises one or more surfactants having a chemical structure that includes a polyethylene glycol (PEG) moiety being PEGylated emulsifiers selected from the group consisting of d-alpha-tocopheryl polyethylene glycol succinate, d-alpha-tocopheryl PEG-1000 succinate, PEG-15 hydroxystearate, PEG-30 castor oil, PEG-32 lauroyl glycerides, PEG-32 stearoyl glycerides, PEG-35 castor oil, PEG-40 hydrogenated castor oil, PEG-6 lauroyl glycerides, PEG-6 linoleoyl glycerides, PEG-6 oleoyl glycerides, PEG-8 caprylic/capric glycerides, polyoxyl 20 cetostearyl ether, polyoxyethylenue-laurylether, polyoxyethylene-23-laurylether, and combinations thereof.

14. The orally dissolvable or chewable tableted powder formulation according to claim 1, wherein the one or more lipids comprises one or more triglycerides.

15. The orally dissolvable or chewable tableted powder formulation according to claim 1, wherein the one or more lipids comprises one or more triglycerides selected from one or more C4 to C14 triglycerides.

16. The orally dissolvable or chewable tableted powder formulation according to claim 1, wherein the one or more lipids comprises one or more lipophilic compounds selected from the group consisting of glyceryl caprylate, glyceryl caprate, glyceryl monocaprylate, glyceryl monooleate, glyceryl monostearate, glyceryl monolinoleate, polyglyceryl-3 dioleate, propylene glycol dicaprylocaprate, propylene glycol dilaurate, benzyl alcohol, alpha-tocopherol, isopropyl myristate, glycerol monocaprylocaprate, and combinations thereof.

17. The orally dissolvable or chewable tableted powder formulation according to claim 1, wherein the one or more lipids is present in an amount of 5 to 40% by weight of the one or more self-emulsifying systems.

18. The orally dissolvable or chewable tableted powder formulation according to claim 1, wherein the one or more hydrophilic solvents is present in an amount of at least 5% by weight of the one or more liquid self-emulsifying systems.

19. The orally dissolvable or chewable tableted powder formulation according to claim 1, wherein the one or more hydrophilic solvents is present in an amount of 10 to 50% by weight of the one or more liquid self-emulsifying systems.

20. The orally dissolvable or chewable tableted powder formulation according to claim 1, wherein the one or more hydrophilic solvents is selected from the group consisting of propylene glycol, acetyl tributyl citrate, acetyl triethyl citrate, dimethyl sulfoxide, ethanol, ethyl oleate, glycerol triacetate, diethylene glycol monoethyl ether, polyethylene glycol 200, polyethylene glycol 300, polyethylene glycol 400, polyethylene glycol 600, propan-2-ol, glycerol, triethyl citrate, and combinations thereof.

21. The orally dissolvable or chewable tableted powder formulation according to claim 1, wherein the one or more hydrophilic solvents comprises propylene glycol.

22. The orally dissolvable or chewable tableted powder formulation according to claim 1, wherein the one or more lipids comprises one or more triglycerides comprising a fully hydrogenated vegetable oil.

* * * * *